US012059902B2

(12) United States Patent
Sasaki et al.

(10) Patent No.: US 12,059,902 B2
(45) Date of Patent: Aug. 13, 2024

(54) PRINTING APPARATUS AND METHOD FOR THE APPARATUS

(71) Applicant: CANON KABUSHIKI KAISHA, Tokyo (JP)

(72) Inventors: Takashi Sasaki, Kanagawa (JP); Shuichi Tokuda, Kanagawa (JP); Takahiro Kiuchi, Tokyo (JP); Koki Kudo, Kanagawa (JP); Yuka Tani, Tokyo (JP); Akira Kida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 17/703,428

(22) Filed: Mar. 24, 2022

(65) Prior Publication Data

US 2022/0305793 A1 Sep. 29, 2022

(30) Foreign Application Priority Data

Mar. 29, 2021 (JP) ................................ 2021-054575

(51) Int. Cl.
*B41J 2/165* (2006.01)

(52) U.S. Cl.
CPC ....... *B41J 2/16535* (2013.01); *B41J 2/16532* (2013.01); *B41J 2/16579* (2013.01); *B41J 2/16588* (2013.01)

(58) Field of Classification Search
CPC B41J 2/16535; B41J 2/16532; B41J 2/16579; B41J 2/16588
See application file for complete search history.

(56) References Cited

U.S. PATENT DOCUMENTS

| | | | | |
|---|---|---|---|---|
| 11,001,066 B2 * | 5/2021 | Motomura | ............. | C09D 11/38 |
| 2008/0186343 A1 * | 8/2008 | Sugahara | ................. | B41J 29/02 347/14 |
| 2020/0108610 A1 * | 4/2020 | Kiuchi | ................. | B41J 2/16523 |

FOREIGN PATENT DOCUMENTS

| | | | | |
|---|---|---|---|---|
| CN | 111002714 A * | 4/2020 | .......... | B41J 2/16508 |
| JP | 2018130936 A | 8/2018 | | |

* cited by examiner

*Primary Examiner* — Sharon Polk
(74) *Attorney, Agent, or Firm* — Canon U.S.A., Inc. IP Division

(57) ABSTRACT

A printing apparatus includes a printing unit that includes an ejection port surface provided with ejection ports through which liquid is ejected, a wiping unit, a depressurizing unit, and detection unit. The wiping unit has an opening and wipes the ejection port surface by moving in a predetermined direction while the opening abuts against the ejection port surface. The depressurizing unit applies negative pressure to the ejection port surface via the opening. The detection unit detects an ejection state of the ejection ports. After driving the depressurizing unit when the opening abuts against the ejection port surface, the suction operation sucks the liquid from the ejection ports while moving the wiping unit. The suction operation is performed from a first ejection port detected as an ejection-failed ejection port by the detection unit under a suction condition different from suction conditions of the ejection ports other than the first ejection port.

14 Claims, 15 Drawing Sheets

PRINTING APPARATUS AND METHOD FOR THE APPARATUS

BACKGROUND

Field

The present disclosure relates to a printing apparatus that prints an image and a method of controlling the printing apparatus.

Description of the Related Art

A configuration of a printing apparatus is disclosed in Japanese Patent Laid-Open No. 2018-130936, which sucks ink adhering to an ejection port by moving a vacuum wiper unit along an ejection port array to resolve ejection failure.

However, with the configuration disclosed in Japanese Patent Laid-Open No. 2018-130936, since the same suction pressure is applied to ejection-failed ejection ports and ejection ports in a good ejection state, the ejection failure may not be resolved if low suction pressure is applied and excessive ink may be sucked if high suction pressure is applied.

SUMMARY

The present disclosure provides a printing apparatus capable of appropriately recovering the ejection-failed ejection ports.

According to an aspect of the present disclosure, a printing apparatus includes a printing unit including an ejection port surface provided with a plurality of ejection ports through which liquid is ejected, a wiping unit configured to have an opening capable of abutting against the ejection port surface and configured to wipe the ejection port surface by moving in a predetermined direction while abutting against the ejection port surface with the opening, a depressurizing unit configured to apply negative pressure to the ejection port surface via the opening, a detection unit configured to detect an ejection state of the plurality of ejection ports, and a control unit configured to perform a suction operation, wherein, after driving the depressurizing unit in a state in which the opening abuts against the ejection port surface, the control unit performs the suction operation to suck the liquid from the plurality of ejection ports while moving the wiping unit, and wherein, in performing the suction operation, the control unit performs the suction operation from a first ejection port detected as an ejection-failed ejection port by the detection unit under a suction condition different from suction conditions of the ejection ports in the plurality of ejection ports other than the first ejection port.

Further features of the present disclosure will become apparent from the following description of exemplary embodiments with reference to the attached drawings.

DESCRIPTION OF THE EMBODIMENTS

Embodiments of the present disclosure will herein be described with reference to the drawings. However, the embodiments described below do not limit the present disclosure and all the combinations of features described in the embodiments are not necessarily essential to the resolution in the present disclosure. In addition, the relative positions, the shapes, and so on of components described in the embodiments are only examples and are not intended to limit the scope of the present disclosure to the embodiments.

Embodiment

Figure 1:
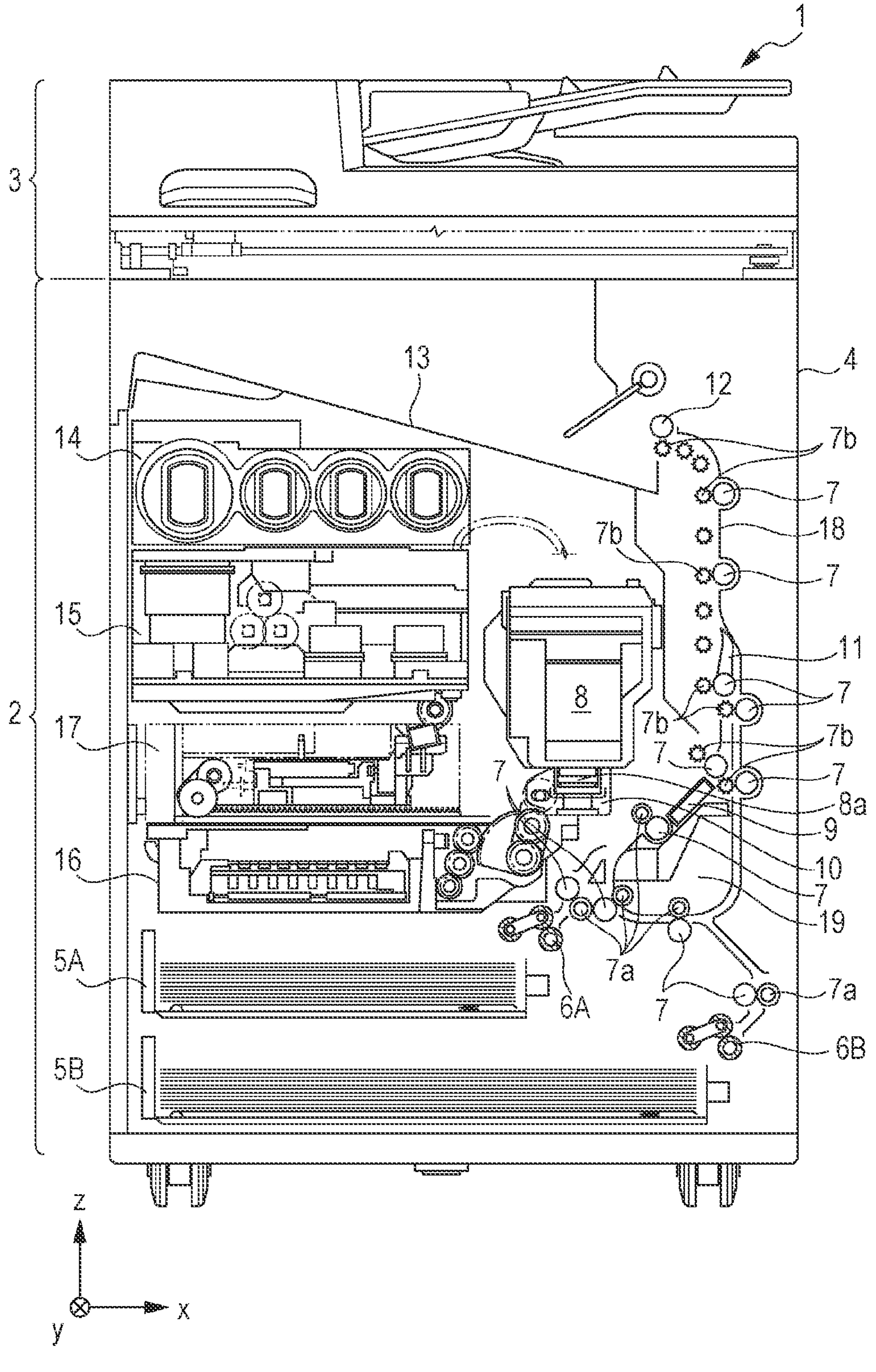
FIG. 1 is a diagram illustrating a standby state of an inkjet printing apparatus according to an embodiment.

FIG. 1 is a diagram illustrating an internal configuration of an inkjet printing apparatus (hereinafter referred to as a printing apparatus 1) used in an embodiment. Referring to FIG. 1, the x direction is the horizontal direction, the y direction (the direction perpendicular to the plane of paper) is the direction in which ejection ports are arranged in a printing head 8 described below, and the z direction is the vertical direction.

The printing apparatus 1 is a multifunctional peripheral including a printing section 2 and a scanner section 3. The printing section 2 and the scanner section 3 are capable of separately or cooperatively performing various processes concerning a printing operation and a reading operation. The scanner section 3 includes an automatic document feeder (ADF) and a flatbed scanner (PBS) and is capable of scanning an original document automatically fed by the ADF and scanning of an original document placed on the platen glass of the FBS by a user. Although the printing apparatus 1 is a multifunctional peripheral including the printing section 2 and the scanner section 3 in the present embodiment, the printing apparatus 1 may have a mode in which the scanner section 3 is not provided. FIG. 1 illustrates a standby state in which the printing apparatus 1 is not performing the printing operation and the reading operation.

In the printing section 2, a first cassette 5A and a second cassette 5B, in which a recording medium (cut sheets) S is loaded, are detachably provided on the bottom in the downward vertical direction of a housing 4.

A relatively small recording medium up to the A4 size is stacked in the first cassette 5A and a relatively large recording medium up to the A3 size is stacked in the second cassette 5B. A first feeding unit 6A for separating the stacked recording medium one sheet by one sheet and feeding the separated sheets is provided near the first cassette 5A. Similarly, a second feeding unit 6B is provided near the second cassette 5B. In the printing operation, the recording medium S is selectively fed from either of the first cassette 5A and the second cassette 5B.

Conveyance rollers 7, a discharge roller 12, pinch rollers 7*a*, spur rollers 7*b*, a guide 18, an inner guide 19, and a flapper 11 compose a conveyance mechanism for leading the recording medium S in a certain direction. The conveyance rollers 7 are driving rollers that are placed at the upstream side and the downstream side of the printing head 8 and that are driven by a conveyance motor (not illustrated). The pinch rollers 7*a* are driven rollers that nip the recording medium S in cooperation with the conveyance rollers 7 and rotate the recording medium S. The discharge roller 12 is a driving roller that is placed at the downstream side of the conveyance rollers 7 and that is driven by the conveyance motor (not illustrated). The spur rollers 7*b* nip the recording medium S in cooperation with the conveyance rollers 7 and the discharge roller 12, which are placed at the downstream side of the printing head 8, and convey the recording medium S.

The guide 18 is provided on a conveyance path of the recording medium S and guides the recording medium S in a certain direction. The inner guide 19 is a member extending in the y direction, has a curved side face, and guides the recording medium S along the side face. The flapper 11 is a member for switching the direction in which the recording medium S is conveyed in a double-sided printing operation. The discharge tray 13 is a tray for stacking and holding the recording medium S discharged from the discharge roller 12 when the printing operation is completed.

The printing head 8, which is a printing unit of the present embodiment, is a full-line type color inkjet printing head (line head). Multiple ejection ports of a number corresponding to the width of the recording medium S are arranged along the y direction in FIG. 1 in the printing head 8. The ejection ports eject ink in accordance with printing data. In other words, the printing head 8 is configured so as to be capable of ejecting the ink of multiple colors. When the printing head 8 is at a standby position, an ejection port surface 8*a* of the printing head 8 is directed to the downward vertical direction, as illustrated in FIG. 1, and is covered with a cap unit 10. In the printing operation, the orientation of the printing head 8 is varied by a print controller 202 described below so that the ejection port surface 8*a* is opposed to a platen 9. The platen 9 is composed of a plane plate extending in the y direction and supports the recording medium S on which the printing operation is performed by the printing head 8 from the rear side. Movement from the standby position to a printing position of the printing head 8 will be described in detail below.

An ink tank unit 14 stores the ink of four colors to be supplied to the printing head 8. An ink supply unit 15 is provided on a flow channel with which the ink tank unit 14 is connected to the printing head 8 and adjusts the pressure and the flow rate of the ink in the printing head 8 to appropriate ranges. A circulating ink supply system is adopted in the present embodiment and the ink supply unit 15 adjusts the pressure of the ink to be supplied to the printing head 8 and the flow rate of the ink collected from the printing head 8 to appropriate ranges.

A maintenance unit 16 includes the cap unit 10 and a wiping unit 17 and activates the cap unit 10 and the wiping unit 17 at certain timings to perform a maintenance operation for the printing head 8. The maintenance operation will be described in detail below.

Figure 2:
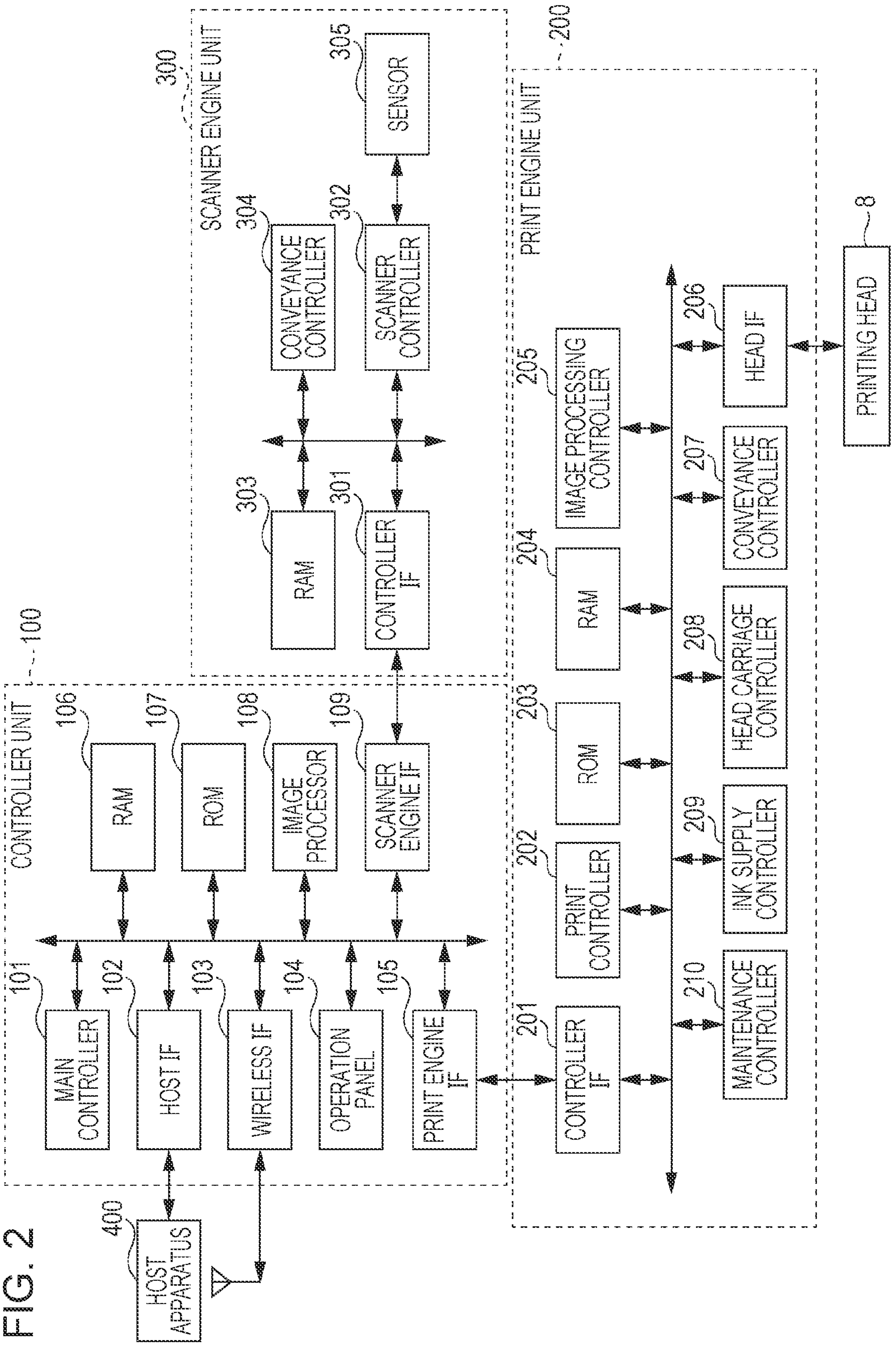
FIG. 2 is a block diagram illustrating the configuration of a control system in the inkjet printing apparatus.

FIG. 2 is a block diagram illustrating the control configuration in the printing apparatus 1. The control configuration is composed of a print engine unit 200 mainly controlling the printing section 2, a scanner engine unit 300 controlling the scanner section 3, and a controller unit 100 controlling the entire printing apparatus 1. The print controller 202 functions as a control unit that controls various mechanisms in the print engine unit 200 in accordance with instructions from a main controller 101 in the controller unit 100. Various mechanisms in the scanner engine unit 300 are controlled by the main controller 101 in the controller unit 100. The control configuration will now be described in detail.

In the controller unit 100, the main controller 101 composed of a central processing unit (CPU) controls the entire printing apparatus 1 in accordance with programs and various parameters stored in a read only memory (ROM) 107 while using a random access memory (RAM) 106 as a working area. For example, upon input of a print job from a host apparatus 400 via a host interface (IF) 102 or a wireless IF 103, an image processor 108 performs certain image processing to image data that is received in accordance with an instruction from the main controller 101. The main controller 101 transmits the image data subjected to the image processing to the print engine unit 200 via a print engine IF 105.

The printing apparatus 1 may acquire the image data from the host apparatus 400 through wireless communication or wired communication or may acquire the image data from an external storage unit (for example, a universal serial bus (USB) memory) connected to the printing apparatus 1. The communication methods used in the wireless communication and the wired communication are not limited. For example, Wireless Fidelity (Wi-Fi) (registered trademark) or Bluetooth (registered trademark) may be applicable as the communication method used in the wireless communication. USB or the like may be applicable as the communication method used in the wired communication. For example, upon input of a scanning command from the host apparatus 400, the main controller 101 transmits the command to the scanner section 3 via a scanner engine IF 109.

An operation panel 104 is a mechanism used by the user for input into and output from the printing apparatus 1. The user instructs an operation, such as a copy operation or a scanning operation, sets a print mode, and recognizes information about the printing apparatus 1 with the operation panel 104.

In the print engine unit 200, the print controller 202 composed of a CPU controls various mechanisms in the printing section 2 in accordance with programs and various parameters stored in a ROM 203 while using a RAM 204 as a working area. Upon reception of various commands and image data via a controller IF 201, the print controller 202 temporarily stores the commands and the image data in the RAM 204. In order to use the printing head 8 for the printing operation, the print controller 202 causes an image processing controller 205 to convert the stored image data into the printing data to use the printing head 8 for the printing operation.

Upon generation of the printing data, the print controller 202 causes the printing head 8 to perform the printing operation based on the printing data via a head IF 206. At this time, the print controller 202 drives the first feeding unit 6A and second feeding unit 6B, the conveyance rollers 7, the discharge roller 12, and the flapper 11 illustrated in FIG. 1 via a conveyance controller 207 to convey the recording medium S. The printing operation by the printing head 8 is performed in conjunction with the conveyance operation of the recording medium S in accordance with the instruction from the print controller 202 to perform a printing process.

A head carriage controller 208 varies the orientation and/or the position of the printing head 8 in accordance with the operation state, such as a maintenance state or a printing state, of the printing apparatus 1. An ink supply controller 209 controls the ink supply unit 15 so that the pressure of the ink supplied to the printing head 8 is within an appropriate range. A maintenance controller 210 controls the operations of the cap unit 10 and the wiping unit 17 in the maintenance unit 16 in the maintenance operation for the printing head 8.

In the scanner engine unit 300, the main controller 101 controls the hardware resources in a scanner controller 302 in accordance with the programs and the various parameters stored in the ROM 107 while using the RAM 106 as the working area. Various mechanisms in the scanner section 3 are controlled in the above manner.

For example, the original document loaded on the ADF by the user is conveyed via a conveyance controller 304 and is scanned by a sensor 305 under the control of the main controller 101 via a controller IF 301 for the hardware resources in the scanner controller 302. The scanner controller 302 stores the image data that is scanned in a RAM 303.

The print controller 202 is capable of causing the printing head 8 to perform the printing operation based on the image data scanned by the scanner controller 302 by converting the image data acquired in the above manner into the printing data.

Figure 3:
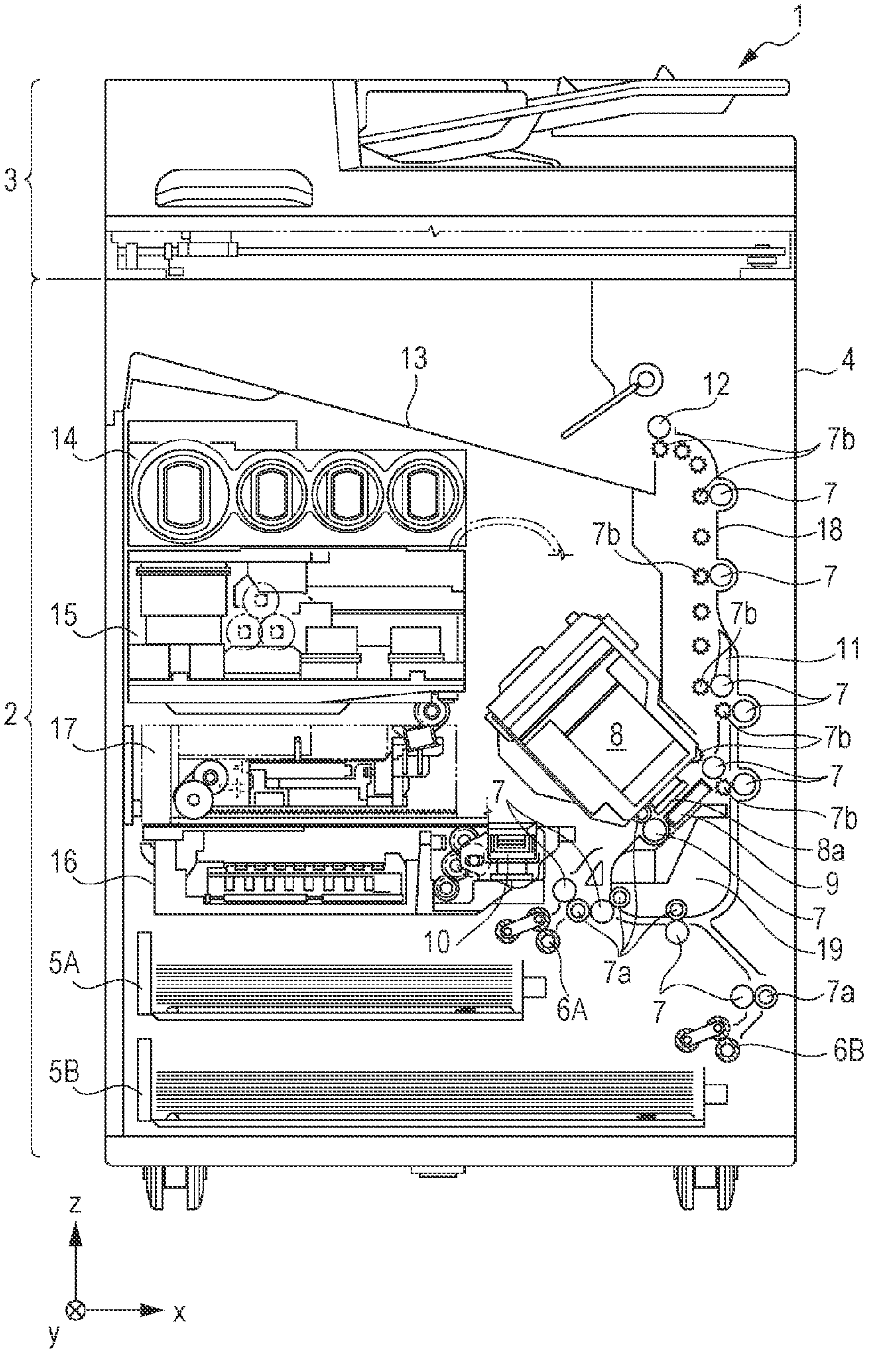
FIG. 3 is a diagram illustrating a printing state of the inkjet printing apparatus.

FIG. 3 is a diagram illustrating the printing apparatus 1 in the printing state. The cap unit 10 is apart from the ejection port surface 8*a* of the printing head 8 and the ejection port surface 8*a* is opposed to the platen 9, compared with the standby state illustrated in FIG. 1. In the present embodiment, the plane surface of the platen 9 is tilted with respect to the horizontal direction by about 45 degrees and the ejection port surface 8*a* of the printing head 8 at the printing position is also tilted with respect to the horizontal direction by about 45 degrees so as to keep a constant distance from the platen 9.

In movement of the printing head 8 from the standby position illustrated in FIG. 1 to the printing position illustrated in FIG. 3, the print controller 202 moves down the cap unit 10 to a withdrawn position illustrated in FIG. 3 using the maintenance controller 210. This causes the ejection port surface 8*a* of the printing head 8 to be apart from a cap member 10*a*. Then, the print controller 202 rotates the printing head 8 by 45 degrees while adjusting the height in the vertical direction of the printing head 8 using the head carriage controller 208 to cause the ejection port surface 8*a* to be opposed to the platen 9. When the printing operation is completed and the printing head 8 is moved from the printing position to the standby position, a reverse process is performed by the print controller 202.

The conveyance path of the recording medium S in the printing section 2 will now be described. Upon input of a printing command, the print controller 202 moves the printing head 8 to the printing position illustrated in FIG. 3 using the maintenance controller 210 and the head carriage controller 208. Then, the print controller 202 drives either of the first feeding unit 6A and the second feeding unit 6B in accordance with the printing command using the conveyance controller 207 to feed the recording medium S.

The maintenance operation for the printing head 8 will now be described. As described above with reference to FIG. 1, the maintenance unit 16 in the present embodiment includes the cap unit 10 and the wiping unit 17 and activates the cap unit 10 and the wiping unit 17 at certain timings to perform the maintenance operation.

Figure 4:
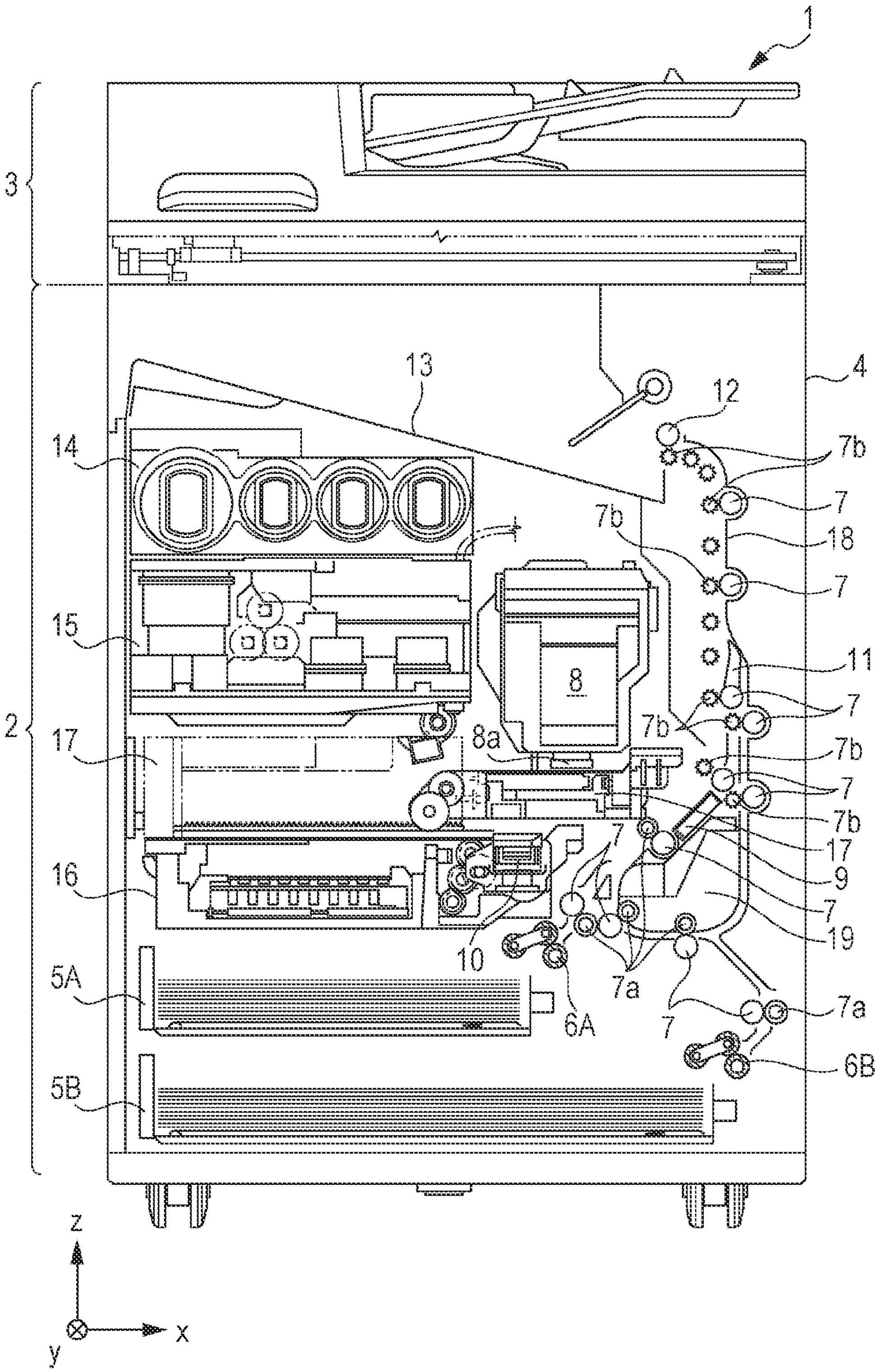
FIG. 4 is a diagram illustrating a maintenance state of the inkjet printing apparatus.

FIG. 4 is a diagram illustrating the printing apparatus 1 in the maintenance state. In movement of the printing head 8 from the standby position illustrated in FIG. 1 to a maintenance position illustrated in FIG. 4, the print controller 202 moves the printing head 8 in the upward vertical direction and moves the cap unit 10 in the downward vertical direction. Then, the print controller 202 moves the wiping unit 17 rightward in FIG. 4 from the withdrawn position. Then, the print controller 202 moves the printing head 8 in the downward vertical direction to move the printing head 8 to the maintenance position where the maintenance operation is available.

In contrast, in movement of the printing head 8 from the printing position illustrated in FIG. 3 to the maintenance position illustrated in FIG. 4, the print controller 202 moves the printing head 8 in the upward vertical direction while rotating the printing head 8 by 45 degrees. Then, the print controller 202 moves the wiping unit 17 rightward from the withdrawn position. Then, the print controller 202 moves the printing head 8 in the downward vertical direction to move the printing head 8 to the maintenance position where the maintenance operation by the maintenance unit 16 is available.

Figure 5A:
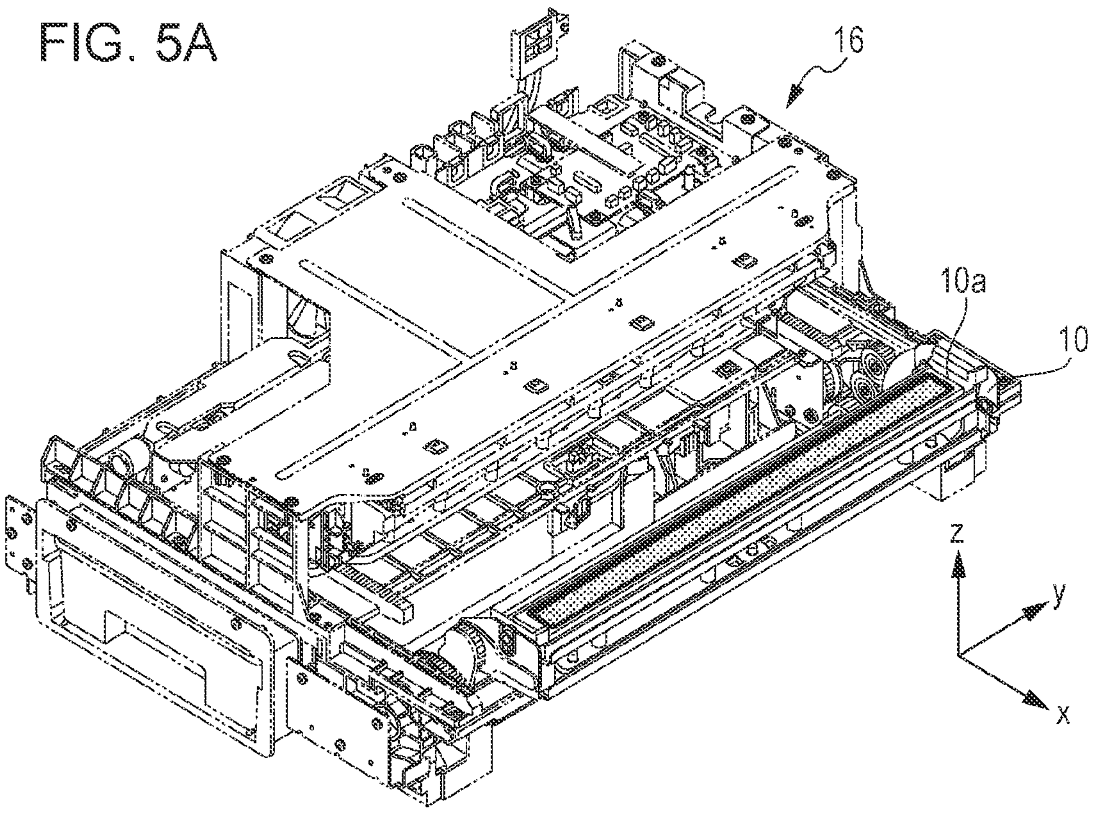
FIG. 5A and FIG. 5B are perspective views illustrating the configuration of a maintenance unit.
Figure 5B:
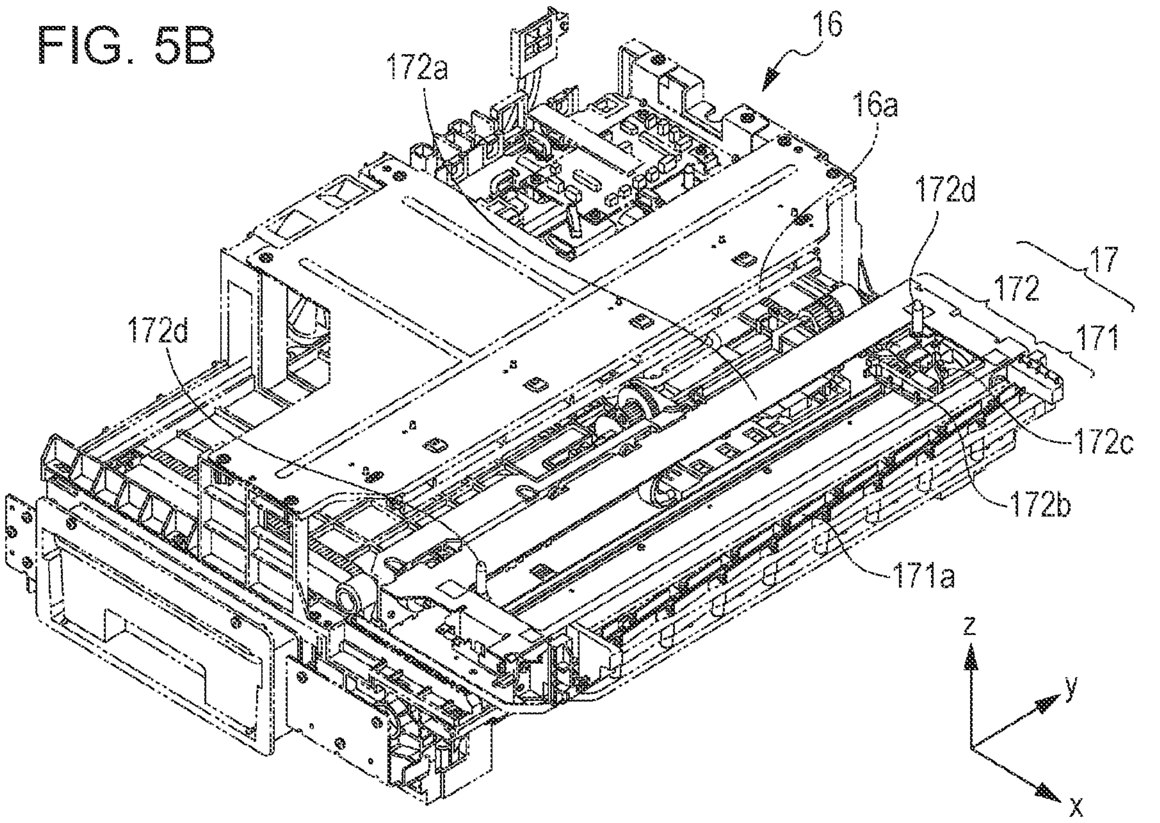

FIG. 5A is a perspective view illustrating a state in which the maintenance unit 16 is at a standby position. FIG. 5B is a perspective view illustrating a state in which the maintenance unit 16 is at a maintenance position. FIG. 5A corresponds to FIG. 1 and FIG. 5B corresponds to FIG. 4.

When the printing head 8 is at the standby position, the maintenance unit 16 is at the standby position illustrated in FIG. 5A, the cap unit 10 is moved in the upward vertical direction, and the wiping unit 17 is housed in the maintenance unit 16. The cap unit 10 has the box-shaped cap member 10*a* extending in the y direction. Causing the cap member 10*a* to be in contact with the ejection port surface 8*a* of the printing head 8 enables evaporation of the ink from the ejection ports to be suppressed. In addition, the cap unit 10 also has a function to collect the ink ejected to the cap member 10*a* in preliminary ejection or the like and to cause a pump (not illustrated) to suck the collected ink.

In contrast, in the maintenance position illustrated in FIG. 5B, the cap unit 10 is moved in the downward vertical direction and the wiping unit 17 is pulled out from the maintenance unit 16. The wiping unit 17 includes two wiper units (wiping units): a blade wiper unit 171 and a vacuum wiper unit 172.

A blade wiper 171*a* of a length corresponding to the arrangement area of the ejection ports is placed in the blade wiper unit 171 in the y direction. The blade wiper 171*a* is provided to wipe the ejection port surface 8*a* along the x direction. When a wiping operation is performed using the blade wiper unit 171, the blade wiper unit 171 in the wiping unit 17 is moved in the x direction in a state in which the printing head 8 is positioned at a height enabling the printing head 8 to be abutted against the blade wiper 171*a*. The ink and so on adhering to the ejection port surface 8*a* are wiped by the blade wiper 171*a* through this movement.

A wet wiper cleaner 16*a* is provided at the entrance of the maintenance unit 16 when the blade wiper 171*a* is housed.

The wet wiper cleaner 16*a* is provided to remove the ink adhering to the blade wiper 171*a* and to apply wet fluid to the blade wiper 171*a*. The adhering substance is removed from the blade wiper 171*a* and the wet fluid is applied to the blade wiper 171*a* by the wet wiper cleaner 16*a* each time the blade wiper 171*a* is housed in the maintenance unit 16. Then, the next time when the ejection port surface 8*a* is wiped, the wet fluid is transferred to the ejection port surface 8*a* to improve the slip performance between the ejection port surface 8*a* and the blade wiper 171*a*.

The vacuum wiper unit 172 includes a plane plate 172*a* having an opening extending in the y direction, a carriage 172*b* movable in the y direction in the opening, and a vacuum wiper 172*c* mounted on the carriage 172*b*. The vacuum wiper 172*c* is provided so as to enable the wiping of the ejection port surface 8*a* in the y direction in conjunction with the movement of the carriage 172*b*.

Figure 7A:
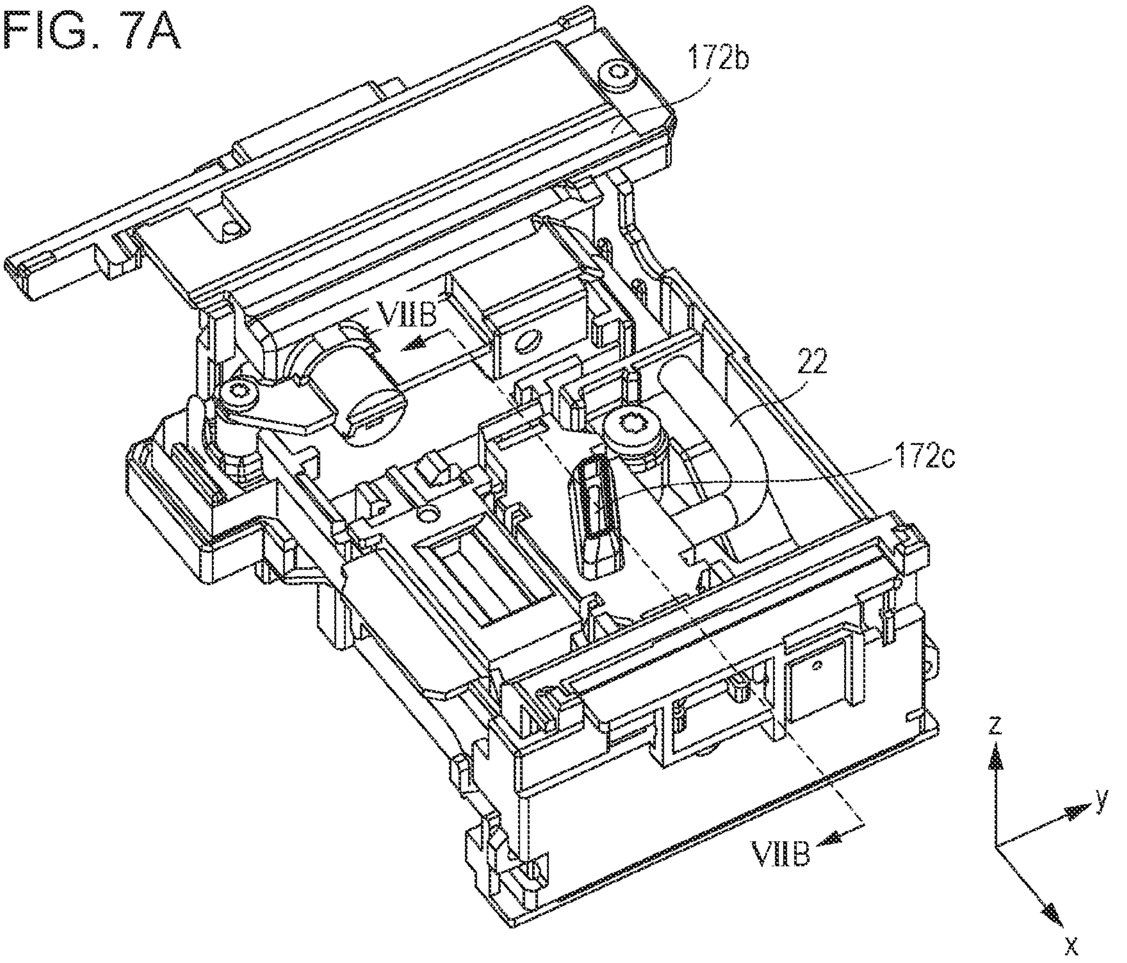
FIG. 7A and FIG. 7B are schematic configuration diagrams of a vacuum wiper.
Figure 7B:
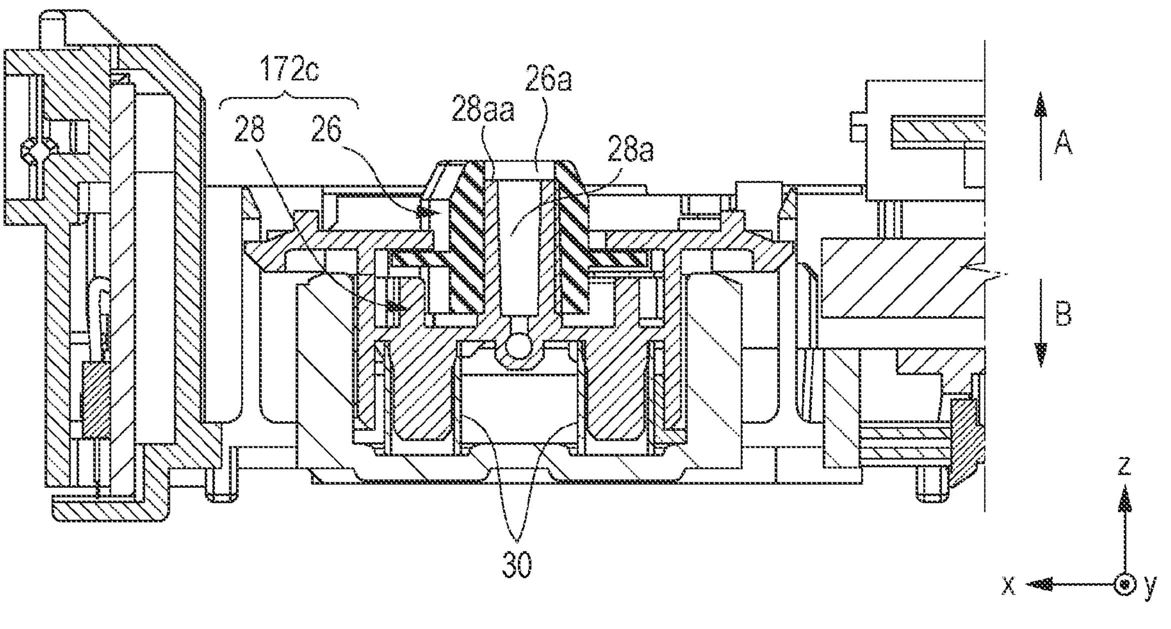

An opening 26*a* that is connected to a suction pump 24 (refer to FIG. 9A and FIG. 9B) and that serves as a suck port is formed at the leading end of the vacuum wiper 172*c* (refer to FIG. 7B). Accordingly, when the carriage 172*b* is moved in the y direction while activating the suction pump 24, the ink and so on adhering to the ejection port surface 8*a* of the printing head 8 are suck into the opening 26*a* while being wiped by the vacuum wiper 172*c*. At this time, the plane plate 172*a* and positioning pins 172*d* provided at both ends of the opening are used for positioning of the ejection port surface 8*a* with respect to the vacuum wiper 172*c*.

A first wiping process in which the wiping operation by the blade wiper unit 171 is performed and the wiping operation by the vacuum wiper unit 172 is not performed and a second wiping process in which the wiping operation by the blade wiper unit 171 and the wiping operation by the vacuum wiper unit 172 are sequentially performed are available in the present embodiment. In the first wiping process, the print controller 202 first pulls out the wiping unit 17 from the maintenance unit 16 in a state in which the printing head 8 is withdrawn in the upward vertical direction from the maintenance position illustrated in FIG. 4.

Then, the print controller 202 moves the printing head 8 in the downward vertical direction to the position enabling the printing head 8 to be abutted against the blade wiper 171*a* and, then, moves the wiping unit 17 into the maintenance unit 16. The ink and so on adhering to the ejection port surface 8*a* are wiped by the blade wiper 171*a* through this movement. In other words, the blade wiper 171*a* wipes the ejection port surface 8*a* when the blade wiper 171*a* is moved from the position at which the blade wiper 171*a* is pulled out from the maintenance unit 16 into the maintenance unit 16.

When the blade wiper unit 171 is housed, the print controller 202 then moves the cap unit 10 in the upward vertical direction to cause the cap member 10*a* to be in contact with the ejection port surface 8*a* of the printing head 8. Then, the print controller 202 performs the preliminary ejection by driving the printing head 8 in this state and sucks the ink collected in the cap member 10*a* with the suction pump 24.

In contrast, in the second wiping process, the print controller 202 first slides and pulls out the wiping unit 17 from the maintenance unit 16 in the state in which the printing head 8 is withdrawn in the upward vertical direction from the maintenance position illustrated in FIG. 4. Then, the print controller 202 moves the printing head 8 in the downward vertical direction to the position enabling the printing head 8 to be abutted against the blade wiper 171*a* and, then, moves the wiping unit 17 into the maintenance unit 16. As a result, the wiping operation of the ejection port surface 8*a* by the blade wiper 171*a* is performed.

Then, the print controller 202 slides the wiping unit 17 from the maintenance unit 16 to pull out the wiping unit 17 to a predetermined position in the state in which the printing head 8 is withdrawn in the upward vertical direction from the maintenance position illustrated in FIG. 4 again. Then, the print controller 202 performs positioning of the ejection port surface 8*a* with respect to the vacuum wiper unit 172 using the plane plate 172*a* and the positioning pins 172*d* while moving down the printing head 8 to a wiping position illustrated in FIG. 4. Then, the print controller 202 performs the wiping operation with the vacuum wiper unit 172 described above. After withdrawing the printing head 8 in the upward vertical direction and housing the wiping unit 17, the print controller 202 performs the preliminary ejection into the cap member 10*a* with the cap unit 10 and a suction operation of the collected ink, as in the first wiping process.

Figure 6A:
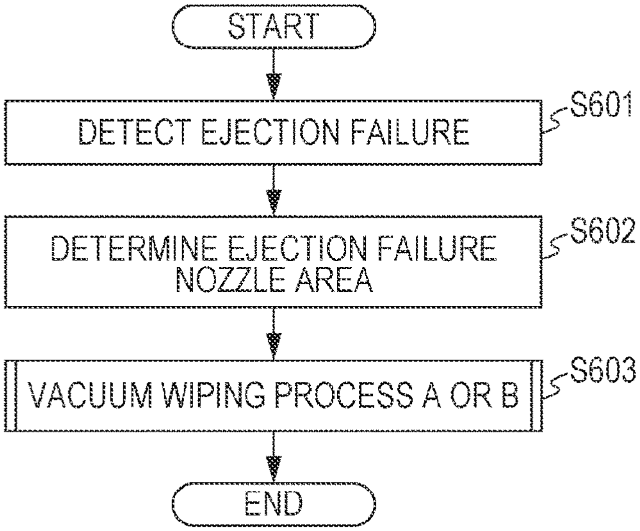
FIG. 6A and FIG. 6B are diagrams for describing how to recover ejection-failed ejection ports.

FIG. 6A is a flowchart illustrating a process to detect ejection-failed ejection ports (hereinafter also referred to as ejection failure nozzles) and a process performed to the ejection failure nozzles. Referring to FIG. 6A, in Step S601, the ejection failure nozzle is detected by an ejection failure detecting method described below and the position of the ejection failure nozzle is recorded in the print controller 202. The detection of the ejection failure is performed for every predetermined time, each time the sheets of a predetermined number are printed, or when an instruction from the user is input.

Figure 6B:
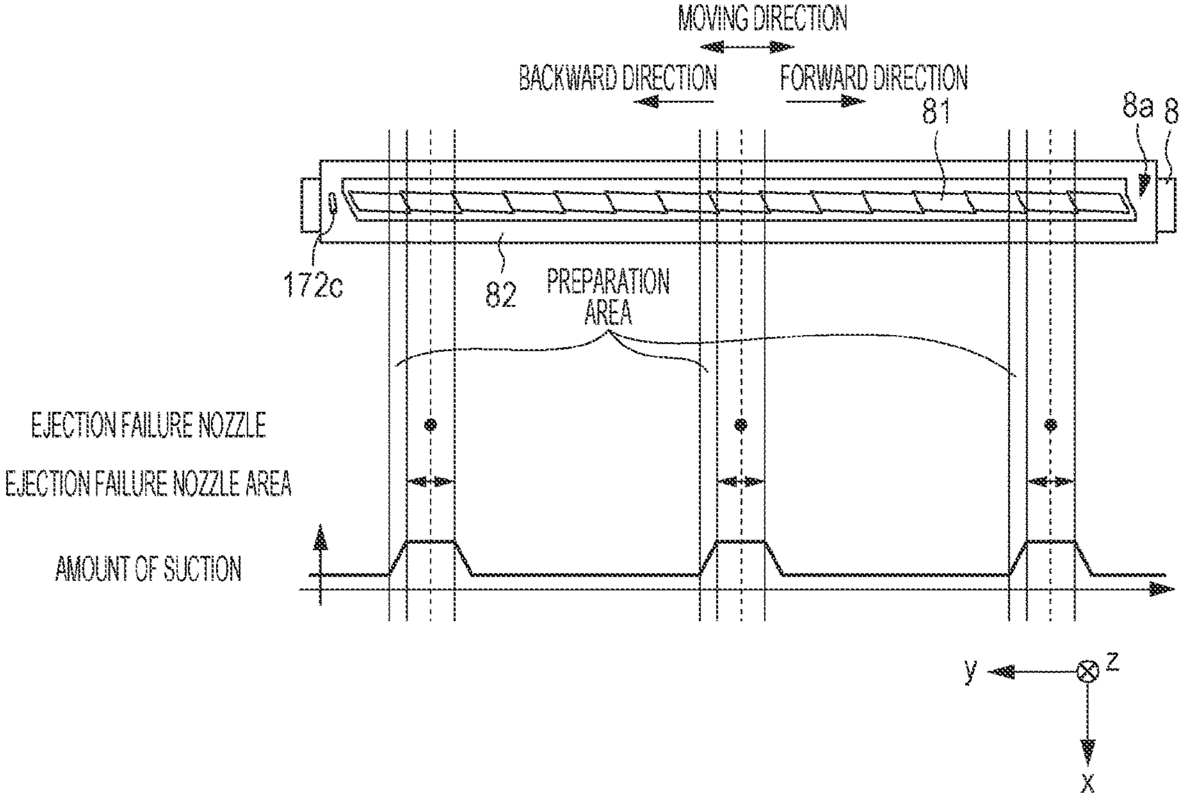

As illustrated in an example in FIG. 6B, in Step S602, the print controller 202 determines an ejection failure nozzle area and a preparation area as peripheral areas of the position of each ejection failure nozzle. In Step S603, the print controller 202 performs a vacuum wiping process A or a vacuum wiping process B described below so that the amount of suction in the determined ejection failure nozzle area is greater than the amounts of suction in the other areas.

Various known methods are available to detect the ejection failure nozzle.

For example, the ink is ejected from all the ejection ports of the printing head to print a test patch, a portion having image void on the test patch is determined by an optical sensor, and the ejection port corresponding to the image void is determined to be the ejection failure nozzle.

Figure 15A:
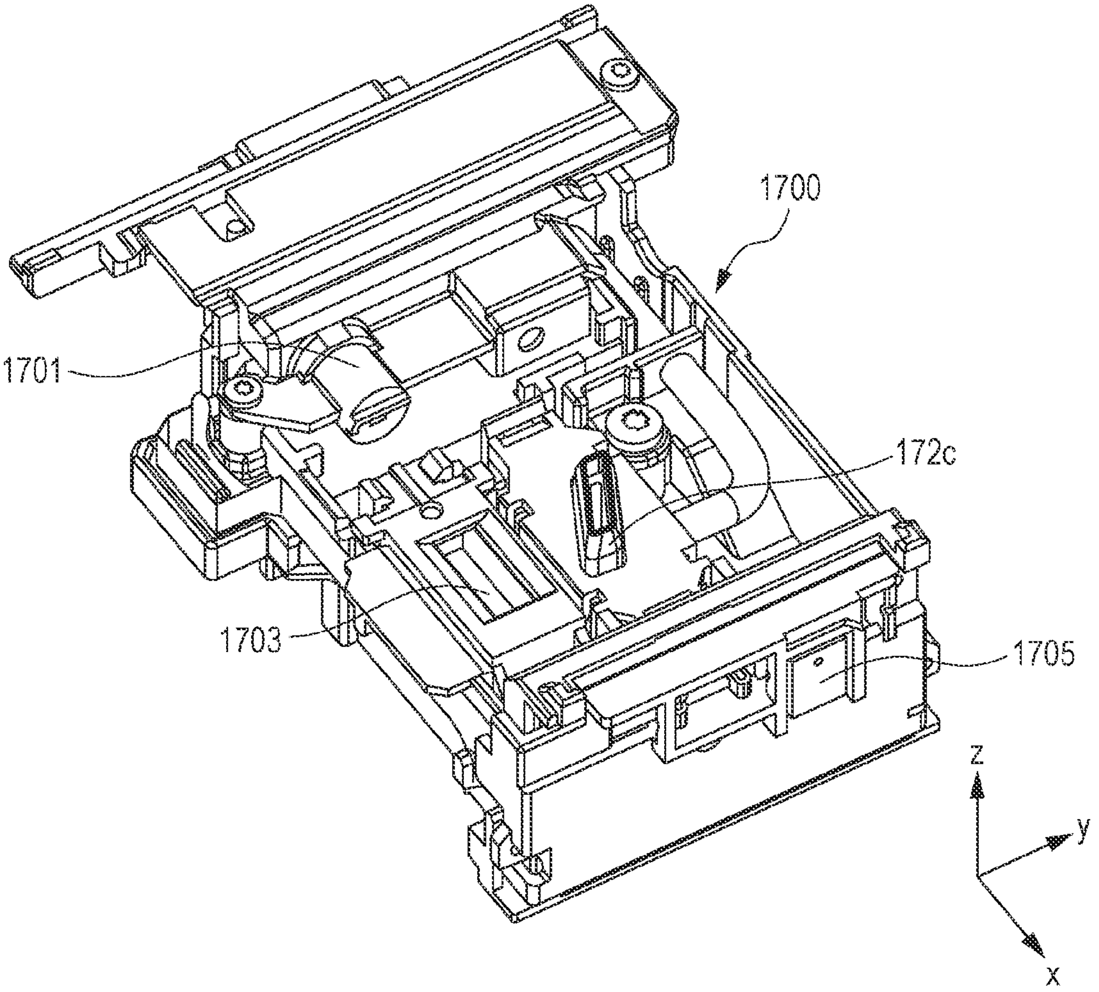
FIG. 15A and FIG. 15B are diagrams for describing an example of a detection unit in an ejection state.
Figure 15B:
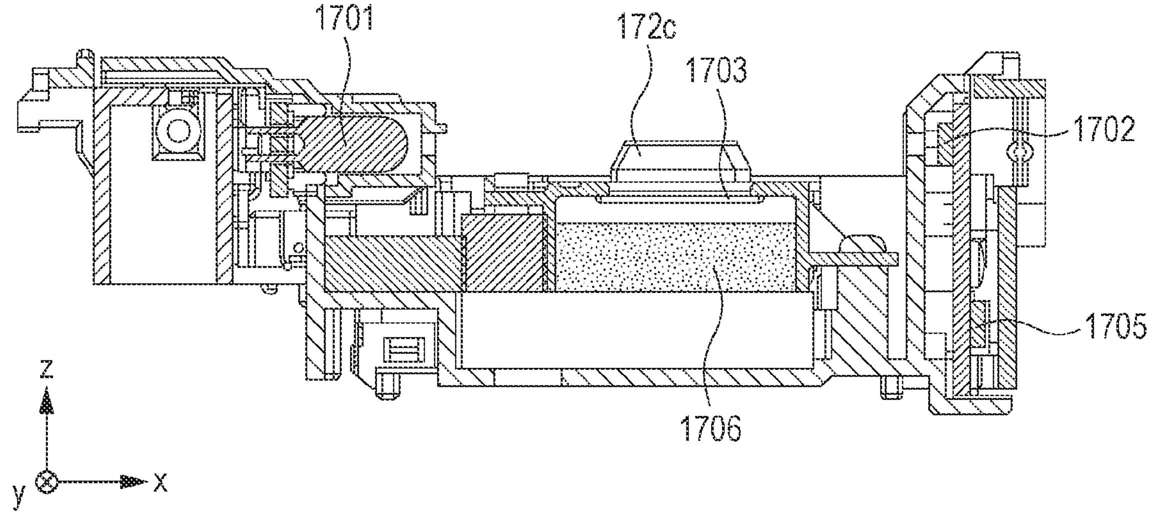

An example of a detection unit in an ejection state in the present embodiment will now be described with reference to FIG. 15A and FIG. 15B. FIG. 15A and FIG. 15B illustrate the configuration of an ejection detection unit 1700, which is the detection unit. FIG. 15A is a perspective view and FIG. 15B is a side view. The ejection detection unit 1700 is capable of being moved in the ±y direction with motors for movement described below. A linear encoder sensor 1705 for detecting the moving position of the ejection detection unit 1700 is placed on a side face of the ejection detection unit 1700. The box-shaped ejection detection unit 1700 includes an ejection detection sensor composed of a light emitting portion 1701 and a light receiving portion 1702, an opening 1703, the vacuum wiper 172*c*, and so on.

Light that is emitted from the light emitting portion 1701, which is a light emitting diode (LED), and that moves in the +x direction is received by the light receiving portion 1702 and the detection value in the light receiving portion 1702 is transmitted to the print controller 202. The opening 1703 for storing ejected ink drops is provided in the downward vertical direction of an optical path from the light emitting portion 1701 to the light receiving portion 1702 and an absorber 1706 for holding the ink is housed below the opening 1703.

In the above configuration, the print controller 202 of the present embodiment performs positioning of the ejection detection unit 1700 with respect to the ejection port to be detected in a state in which the wiping unit 17 is opposed to the ejection port surface 8*a* to cause the ink to be continuously ejected from the ejection port. The ejected ink drops partially block the optical path from the light emitting portion 1701 to the light receiving portion 1702 and the detected value (the voltage) in the light receiving portion 1702 is made lower than that in a case in which the ejection operation is not performed (the amount of voltage change is increased). However, when the ejection port to be detected is not capable of performing the normal ejection operation, the optical path from the light emitting portion 1701 to the light receiving portion 1702 is not blocked or the amount of block is decreased and, thus, the detected value in the light receiving portion 1702 is not much varied, compared with the case in which the ejection operation is not performed. In other words, the print controller 202 is capable of determining the ejection state from the ejection port to be detected based on the magnitude of the amount of change of the detected value (the voltage value).

However, the present disclosure is not limited to the above case. For example, a configuration may be adopted in which temperature information about each printing device of the printing head is acquired from a temperature detection element provided for each printing device to detect the ejection state. In this case, a determination result signal indicating the ink ejection state from the corresponding printing device may be acquired from the temperature information detected by the temperature detection element and the variation of the temperature with a logic circuit (a detection portion) provided in a device substrate to identify the ejection failure nozzle.

A detailed configuration of the vacuum wiper unit 172 and a detailed wiping operation by the vacuum wiper unit 172 will now be described with reference to FIG. 7A to FIG. 12. A wiping operation (hereinafter appropriately referred to as “vacuum wiping” or “a vacuum wiping operation”), which is a recovery operation using the vacuum wiper unit 172, is performed after the wiping operation by the blade wiper unit 171 in the second wiping operation described above.

The configuration of the vacuum wiper 172*c* will now be described with reference to FIG. 7A and FIG. 7B. FIG. 7A illustrates the vacuum wiper 172*c* mounted on the carriage 172*b*.

FIG. 7B is a cross-sectional view taken along the VIIb-VIIb line in FIG. 7A.

The vacuum wiper 172*c* includes the opening 26*a* capable of abutting against the ejection port surface 8*a* to exert negative pressure and is configured so as to wipe the ejection port surface 8*a* through movement in the forward direction. The vacuum wiper 172*c* includes an elastic member 26 that abuts against the ejection port surface 8*a* of the printing head 8 and a support member 28 that supports the elastic member 26.

The support member 28 rises in the z direction and includes a hollow projection 28*a* having an opened upper end 28*aa*. The suction pump 24 (refer to FIG. 9A and FIG. 9B) is connected to the support member 28 via a tube 22 and the pressure in the projection 28*a* is reduced by driving of the suction pump 24 under the control of the print controller 202. In addition, the support member 28 is configured so as to be movable in the z direction within a certain range and is biased in the direction of an arrow A by a biasing member 30, such as a spring. The vacuum wiper 172*c* is jammed due to the abutment against the ejection port surface 8*a* to be moved in the direction of an arrow B against the biasing force of the biasing member 30. Accordingly, when the vacuum wiper 172*c* abuts against the ejection port surface 8*a*, the vacuum wiper 172*c* is in a state in which the vacuum wiper 172*c* presses the ejection port surface 8*a* with the biasing force of the biasing member 30.

The elastic member 26 has the projection 28*a* of the support member 28 inserted therein. In addition, the elastic member 26 rises in the z direction and is designed so that the leading end of the elastic member 26 is made higher than the upper end 28*aa* of the projection 28*a*. When the vacuum wiper 172*c* abuts against the ejection port surface 8*a*, the positional relationship in the z direction between the vacuum wiper 172*c* and the printing head 8 is adjusted so that the ejection port surface 8*a* abuts against the elastic member 26 and the ejection port surface 8*a* does not abut against the support member 28.

The elastic member 26 is made of a material, such as rubber, that hardly damages the ejection port surface 8*a* and an ejection unit 81 (refer to FIG. 10B) provided on the ejection port surface 8*a* even when the vacuum wiper 172*c* moves while abutting against the ejection port surface 8*a*. The elastic member 26 has the opening 26*a* at the leading end.

The opening 26*a* is sealed by a suction preparation surface Bab (refer to FIG. 10B) of the ejection port surface 8*a* when the vacuum wiper 172*c* abuts against the suction preparation surface 8*ab*. The opening 26*a* is formed so as to be tilted in the x direction by a certain angle.

Figure 8A:
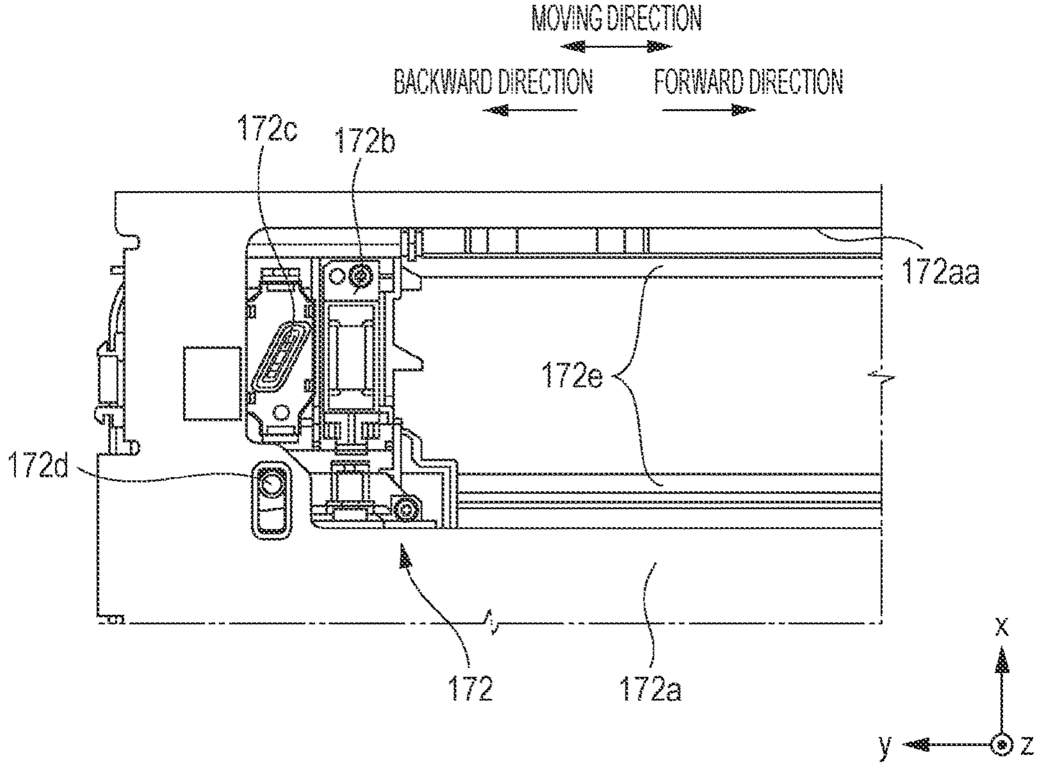
FIG. 8A and FIG. 8B are explanatory drawings of a movement mechanism of a carriage.
Figure 8B:
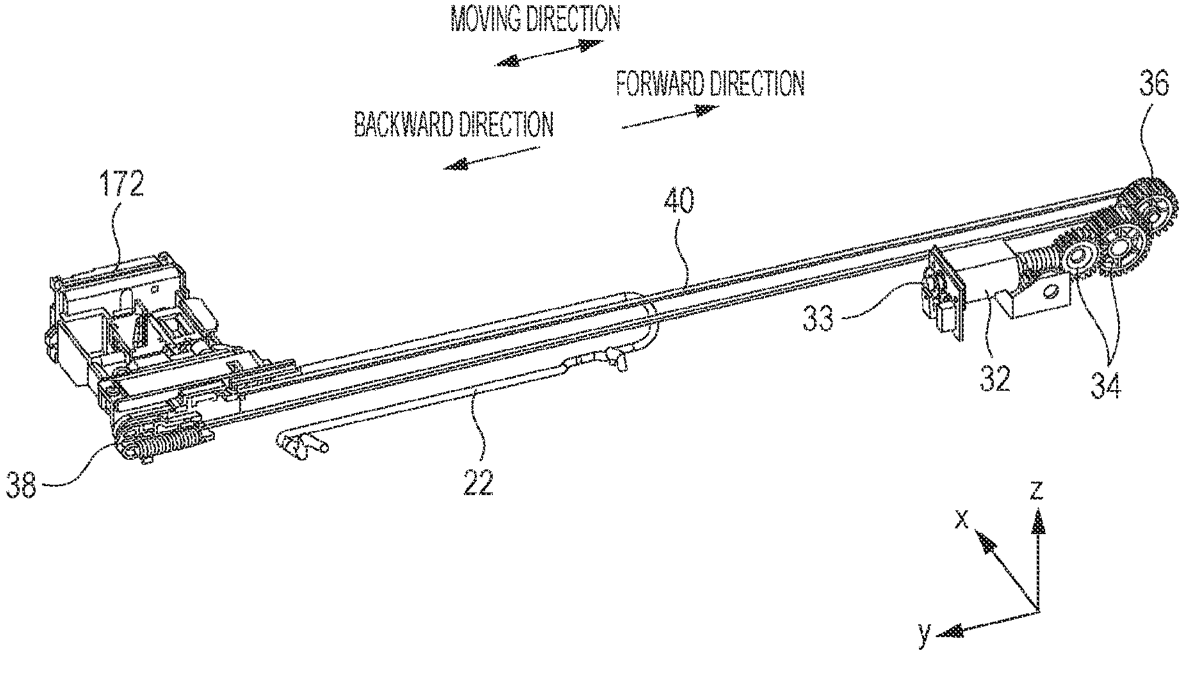

A movement mechanism of the carriage 172*b* having the vacuum wiper 172*c* mounted thereon will now be described with reference to FIG. 8A and FIG. 8B. FIG. 8A is an enlarged view near one end portion of an opening 172*aa* of the plane plate 172*a* on which the carriage 172*b* is positioned. FIG. 8B is a schematic configuration diagram of the movement mechanism of the carriage 172*b*.

The movement mechanism of the carriage 172*b*, which includes the carriage 172*b*, functions as a moving unit of the vacuum wiper 172*c* in the present embodiment. In the vacuum wiper unit 172, the carriage 172*b* having the vacuum wiper 172*c* mounted thereon is provided so as to be slidable along a pair of guide rails 172*e* extending in the y direction.

The carriage 172*b* is reciprocated in the y direction by a vacuum wiper motor 32, which is driven under the control of the print controller 202. Specifically, the carriage 172*b* performs forward movement from one end portion of the opening 172*aa* of the plane plate 172*a* to the other end portion thereof and backward movement from the other end portion to one end portion. When the vacuum wiping operation is not performed, the carriage 172*b* is positioned at one end portion of the opening 172*aa*, as illustrated in FIG. 8A. As described above, the vacuum wiper 172*c* mounted on the carriage 172*b* is configured so as to be capable of reciprocating in the y direction via the carriage 172*b*.

The vacuum wiping operation is performed only when the vacuum wiper 172*c* moves in the forward direction (a predetermined direction) via the carriage 172*b* in the present embodiment. The vacuum wiper motor 32 is connected to a pulley 36 via gears 34. The pulley 36 is positioned at the other end portion side of the opening 172*aa* and a belt 40 extends between the pulley 36 and an idler pulley 38 positioned at one end portion side of the opening 172*aa*. Accordingly, the belt 40 rotates in response to the driving of the vacuum wiper motor 32.

The belt 40 is placed so as to extend in the y direction. The carriage 172*b* is fixed to the belt 40. Accordingly, the rotation of the belt 40 causes the carriage 172*b* to move along the pair of guide rails 172*e* and the moving direction of the carriage 172*b* is determined by the rotational direction of the belt 40. A rotary encoder 33 capable of detecting the amount of rotation, the rotational direction, and so on of the vacuum wiper motor 32 is connected to the vacuum wiper motor 32. The print controller 202 detects the moving direction, the amount of movement, and so on of the carriage 172*b* based on the result of detection by the rotary encoder 33.

A suction mechanism of the vacuum wiper 172*c* will now be described with reference to FIG. 9A and FIG. 9B.

Figure 9A:
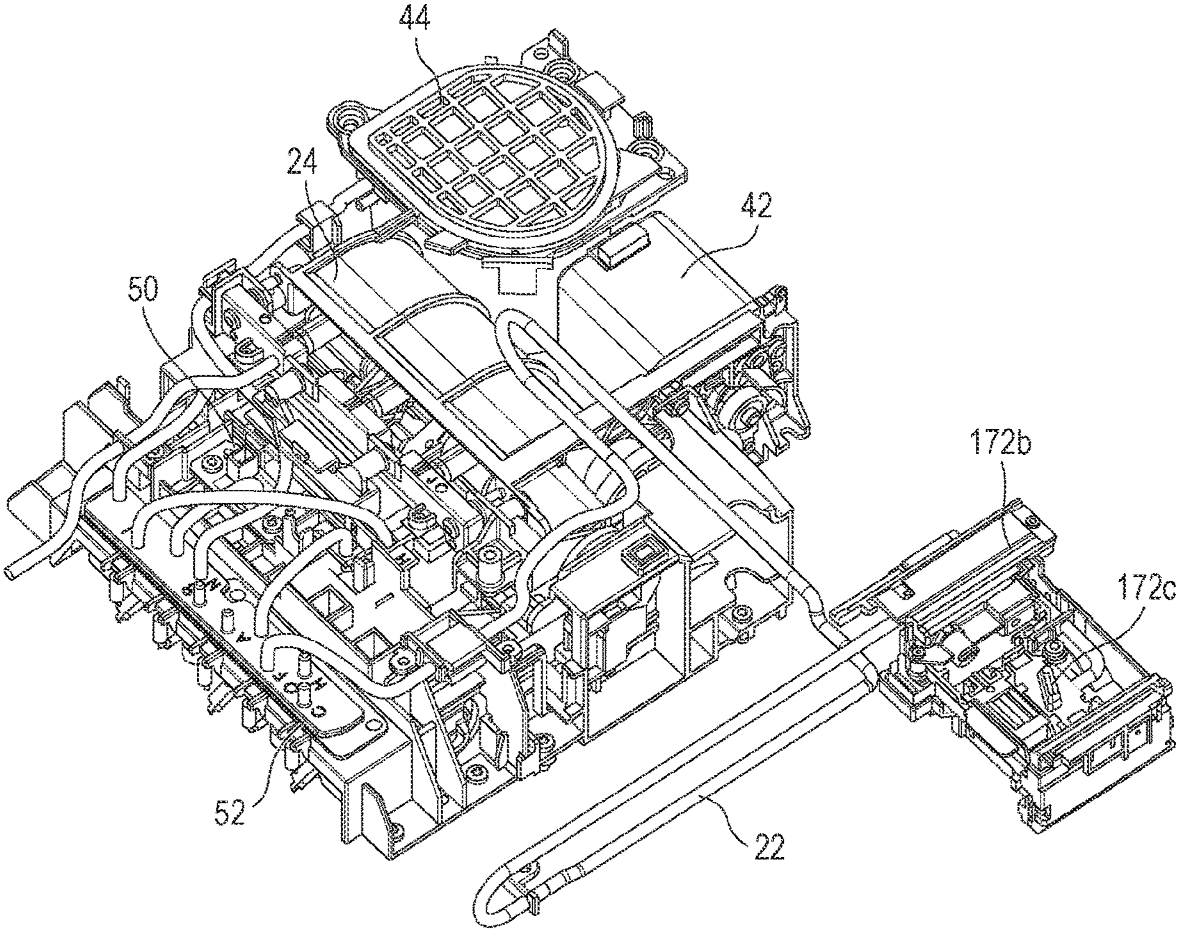
FIG. 9A and FIG. 9B are explanatory drawings of a suction mechanism of the vacuum wiper.
Figure 9B:
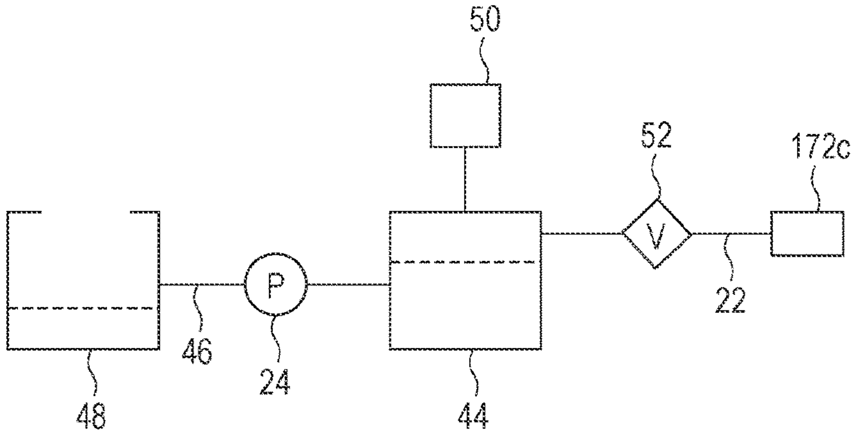

FIG. 9A is a schematic configuration diagram of the suction mechanism connected to the vacuum wiper 172*c* mounted on the carriage 172*b* via the tube 22. FIG. 9B is a diagram schematically illustrating the configuration of the suction mechanism in FIG. 9A.

The vacuum wiper 172*c* mounted on the carriage 172*b* is connected to the suction mechanism composed of the suction pump 24 and so on via the tube 22 functioning as the flow channel. The suction mechanism includes the suction pump 24, a suction motor 42 driving the suction pump 24, and a buffer tank 44 that is capable of storing the ink of a certain amount and that is capable of reducing the pressure in the internal space with the suction pump 24. The suction mechanism also includes a waste ink tank 48 connected to the buffer tank 44 via a flow channel 46 and a pressure sensor 50 (a pressure detection unit) capable of measuring the pressure in the buffer tank 44.

The suction pump 24 is provided on the flow channel 46 with which the buffer tank 44 is connected to the waste ink tank 48. The suction motor 42 driving the suction pump 24 is controlled by the print controller 202. The suction pump 24 is driven by the suction motor 42 under the control of the print controller 202 to reduce the pressure in the buffer tank 44. At this time, the print controller 202 monitors the pressure in the buffer tank 44 with the pressure sensor 50 and stops the suction pump 24 via the suction motor 42 if the pressure in the buffer tank 44 reaches predetermined pressure.

The buffer tank 44 is connected to the tube 22 via a valve 52. Accordingly, the buffer tank 44 is communicated with the vacuum wiper 172*c* via the tube 22 when the valve 52 is opened and the communication state of the buffer tank 44 with the vacuum wiper 172*c* is cleared via the tube 22 when the valve 52 is closed. The ink, foreign substances, and so on sucked from the vacuum wiper 172*c* through the vacuum wiping are collected in the waste ink tank 48 via the tube 22, the buffer tank 44, and so on.

In the state in which the valve 52 is opened (a state in which the buffer tank 44 is connected to the vacuum wiper 172*c*), the pressure in the tube 22 (in the flow channel) is made equal to the pressure in the buffer tank 44. Accordingly, the pressure values in the tube 22 and the vacuum wiper 172*c* connected to the tube 22 are capable of being substantially detected by the pressure sensor 50.

The suction pump 24 is connected to the cap unit 10 via a tube (not illustrated) and is capable of sucking the ink collected in the cap member 10*a*. Accordingly, selective suction from either of the vacuum wiper 172*c* and the cap unit 10 is performed in response to driving of the suction pump 24 through the opening and closing of the valve 52.

Figure 10A:
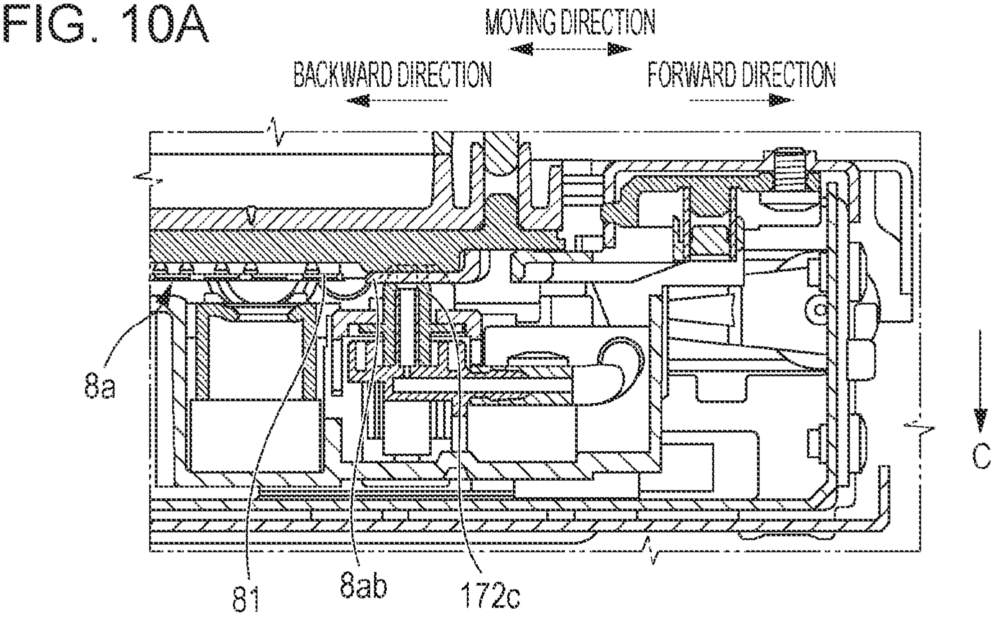
FIG. 10A to FIG. 10D are explanatory drawings concerning abutment of an ejection port surface with the vacuum wiper.
Figure 10B:
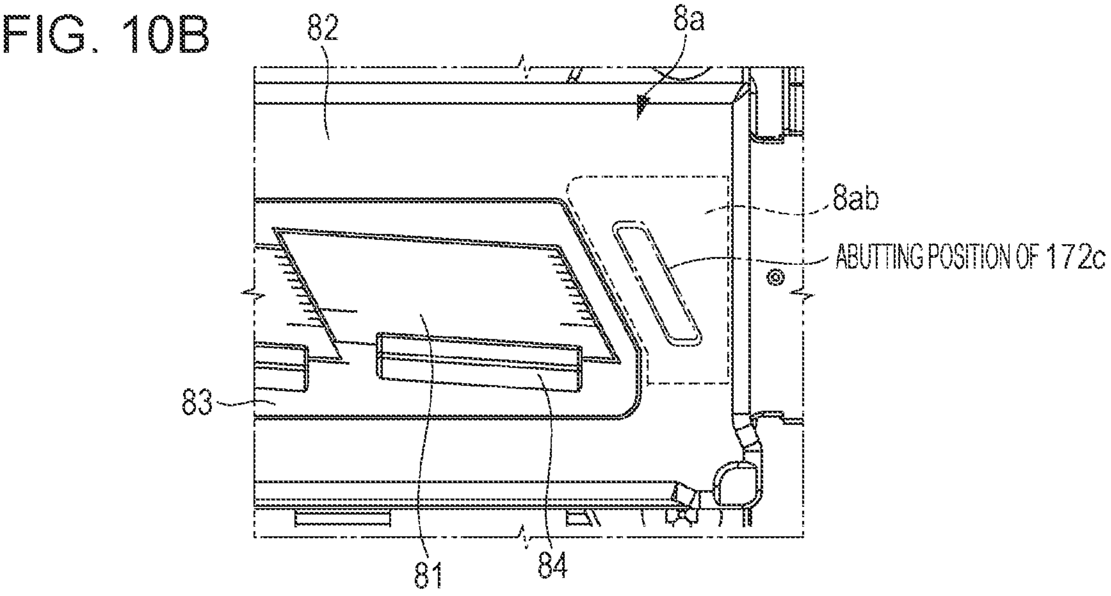
Figure 10C:
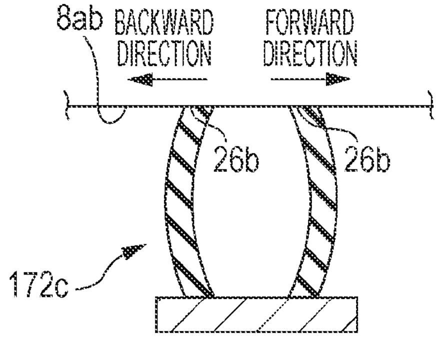
Figure 10D:
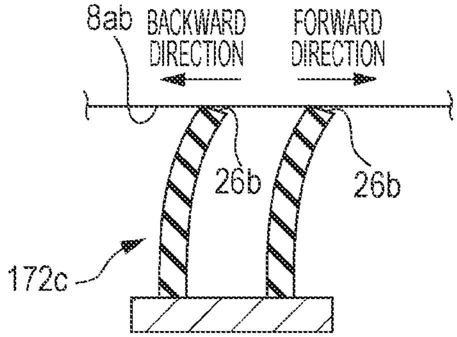

FIG. 10A is a diagram illustrating a state in which the ejection port surface 8*a* of the printing head 8 abuts against the vacuum wiper 172*c* at the start of the vacuum wiping. FIG. 10B is a diagram illustrating the neighborhood of the suction preparation surface Bab of the ejection port surface 8*a* abutting against the vacuum wiper 172*c* at the start of the vacuum wiping. FIG. 10C is a diagram illustrating a state in which the vacuum wiper 172*c* abuts against the suction preparation surface 8*ab*. FIG. 10D is a diagram illustrating a state in which the vacuum wiper 172*c* is moved in the forward direction by a predetermined amount from the state illustrated in FIG. 10C. The illustration of the vacuum wiper 172*c* is simplified in FIG. 10C and FIG. 10D.

Vacuum Wiping Process a (Control of Negative Pressure)

Figure 11:
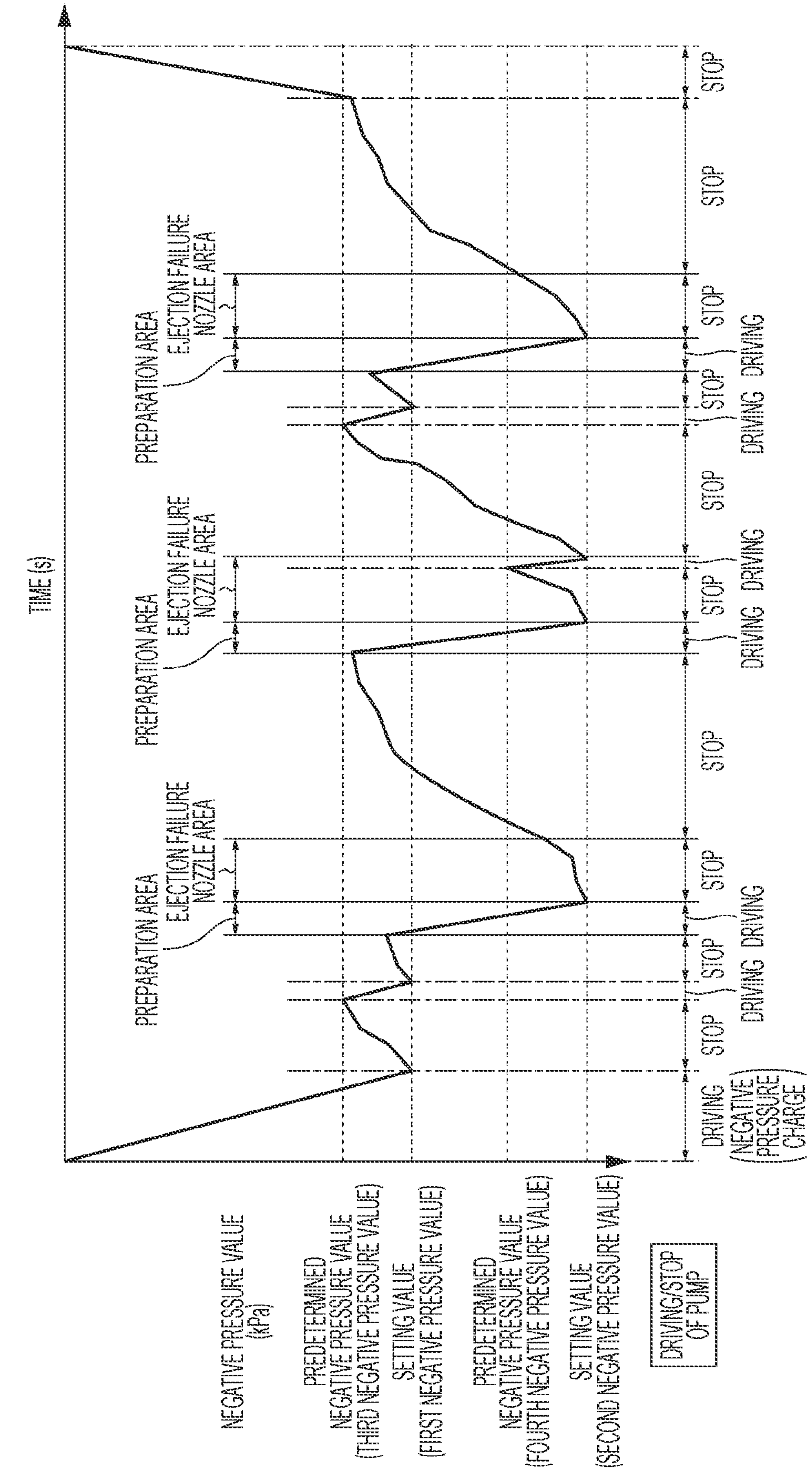
FIG. 11 is a graph illustrating variation in pressure in a vacuum wiping process A.
Figure 13:
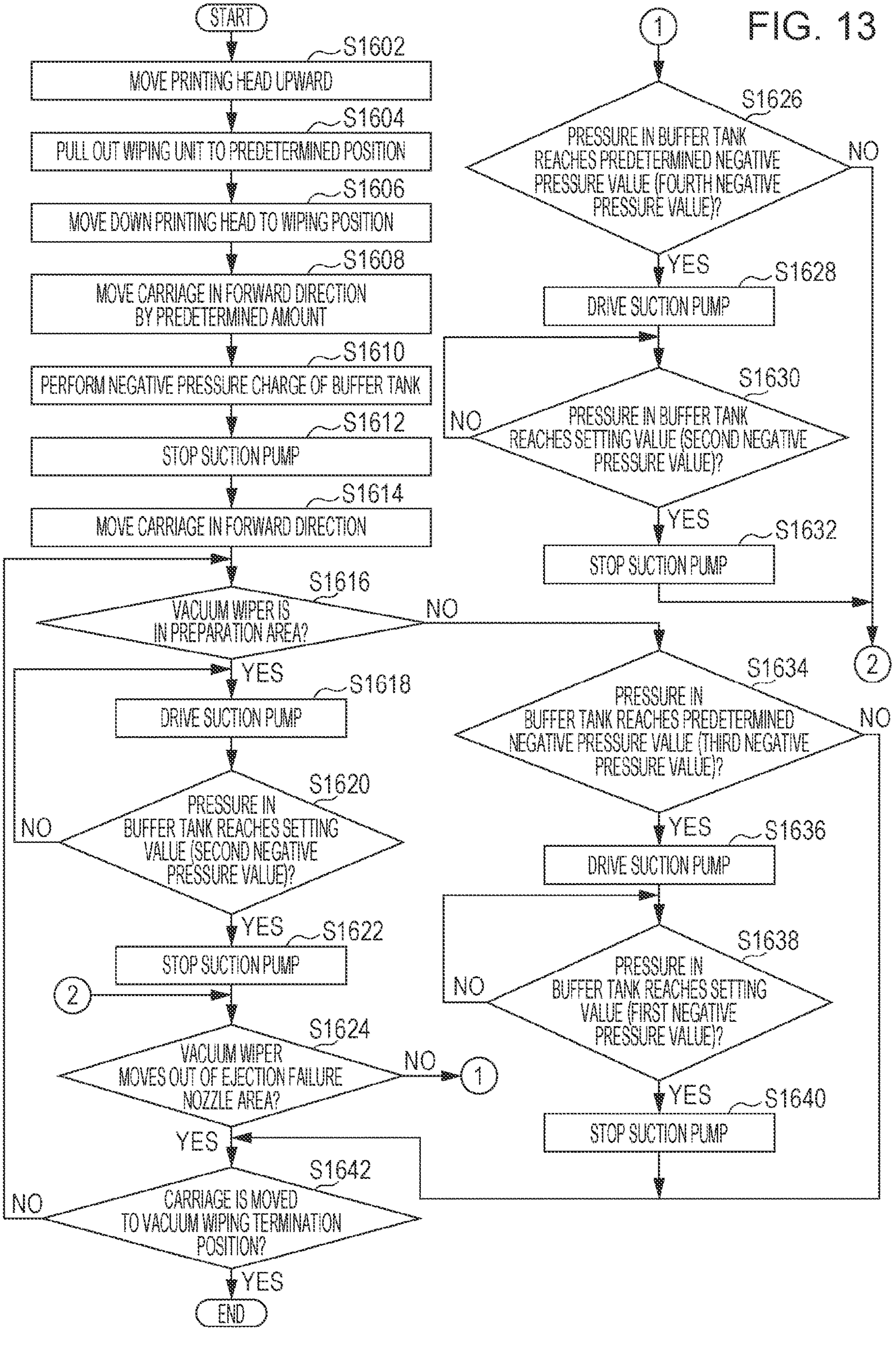
FIG. 13 is a flowchart illustrating the vacuum wiping process A in detail.

FIG. 11 is a graph illustrating how the pressure value in the buffer tank 44 is varied when the vacuum wiping process A is performed. FIG. 13 is a flowchart illustrating the vacuum wiping process A.

Upon start of the vacuum wiping process A, in Step S1602, the printing head 8 is withdrawn upward from the wiping position illustrated in FIG. 4. In Step S1604, the wiping unit 17 is slid from the maintenance unit 16 to be pulled out to a predetermined position. The predetermined position is the position where, when the printing head 8 is moved down to the wiping position, the vacuum wiper 172*c* abuts against the suction preparation surface Bab and moves in the forward direction to enable the vacuum wiping of the ejection ports in the respective ejection units 81.

In Step S1606, the printing head 8 is moved down to the wiping position illustrated in FIG. 4 by the print controller 202. At this time, the carriage 172*b* is positioned at one end portion of the opening 172*aa* and the vacuum wiper 172*c* mounted on the carriage 172*b* abuts against the suction preparation surface Bab of the ejection port surface 8*a* (refer to FIG. 10A). In addition, at this time, the vacuum wiper 172*c* moves in the direction of an arrow C against the biasing force of the biasing member 30 and abuts against the suction preparation surface Bab with predetermined pressure due to the biasing force.

In Step S1608, the carriage 172*b* is moved in the forward direction by a predetermined amount in a state in which the vacuum wiper motor 32 is driven by the print controller 202 to cause the vacuum wiper 172*c* to abut against the ejection port surface 8*a*. In Step S1610, in a state in which the valve 52 is opened to communicate the suction pump 24 with the vacuum wiper 172*c*, the suction motor 42 is driven to perform suction (negative pressure charge) by the suction pump 24 until the pressure in the buffer tank 44 reaches a setting value (a first negative pressure value). This reduces the pressure in the vacuum wiper 172*c* communicating with the buffer tank 44 to the first negative pressure value. In the present embodiment, the setting value (the first negative pressure value) is set to a negative pressure value higher than a predetermined negative pressure value (a third negative pressure value).

Here, since the printing head 8 is moved down to the wiping position, the vacuum wiper 172*c* abutting against the ejection port surface 8*a* abuts against the suction preparation surface Bab with the entire leading end (upper end) surface 26*b* (top face) of the elastic member 26, as illustrated in FIG. 10C. In this state, the biasing force per unit area of the leading end surface 26*b* abutting against the suction preparation surface Bab is small and may not be adaptable to minor irregularities in the opening 26*a* of the elastic member 26 and on the suction preparation surface 8*ab*. Accordingly, in the negative pressure charge of the buffer tank 44, the outside air may easily flow into the apparatus between the vacuum wiper 172*c* and the suction preparation surface Bab not to keep an appropriate negative pressure value.

In the present embodiment, the carriage 172*b* is moved in the forward direction by the predetermined amount in the state in which the vacuum wiper 172*c* abuts against the suction preparation surface Bab to cause the leading end surface 26*b* of the elastic member 26 to abut against the suction preparation surface Bab with its edge, as illustrated in FIG. 10D. Accordingly, the abutment area of the suction preparation surface Bab with the leading end surface 26*b* is decreased and the biasing force per unit area of the leading end surface 26*b* abutting against the suction preparation surface Bab is increased. As a result, the biasing force per unit area of the leading end surface 26*b* is adaptable to the minor irregularities in the opening 26*a* of the elastic member 26 and on the suction preparation surface Bab to inhibit the outside air from flowing into the apparatus between the vacuum wiper 172*c* and the suction preparation surface Bab in the negative pressure charge of the buffer tank 44.

Accordingly, the predetermined amount by which the carriage 172*b* is moved in the forward direction is the amount of movement from the state in which the elastic member 26 abuts against the suction preparation surface Bab with the entire leading end surface 26*b* to the state in which the elastic member 26 abuts against the suction preparation surface Bab with the edge of the leading end surface 26*b*. In addition, the predetermined amount is varied depending on the shape, the material, and so on of the elastic member 26 in the vacuum wiper 172*c* and, for example, is experimentally calculated.

After reducing the pressure in the buffer tank 44 to the setting value (the first negative pressure value) through the negative pressure charge, in Step S1612, the suction motor 42 is stopped by the print controller 202 to stop the suction by the suction pump 24. In Step S1614, the carriage 172*b* is moved in the forward direction by the print controller 202 in the state in which the vacuum wiper 172*c* abuts against the ejection port surface 8*a* to perform the vacuum wiping from the respective ejection ports of the ejection unit 81 arranged on the ejection port surface 8*a*. The vacuum wiper 172*c* is moved at a constant moving speed that is set in accordance with processing conditions in Step S1614.

While the vacuum wiper 172*c* is moving in the forward direction, in Step S1616, the print controller 202 determines whether the vacuum wiper 172*c* is moved to the preparation area. If the print controller 202 determines that the vacuum wiper 172*c* is in the preparation area (YES in Step S1616), in Step S1618, the suction motor 42 is driven to restart the suction by the suction pump 24. Also during the processing in Step S1618, the vacuum wiper 172*c* continues the movement in the forward direction to pass through the ejection failure nozzle area after the preparation area.

In Step S1620, the print controller 202 determines whether the pressure in the buffer tank 44 reaches a setting value (a second negative pressure value). If the print controller 202 determines that the pressure in the buffer tank 44 reaches the setting value (the second negative pressure value) (YES in Step S1620), in Step S1622, the suction pump 24 is stopped and the process goes to Step S1624. The second negative pressure value is higher than the first negative pressure value. In Step S1624, the print controller 202 determines whether the vacuum wiper 172*c* is moved out of the ejection failure nozzle area.

The ejection unit 81, a frame portion 82, a sealing portion 83, and a wiring sealing unit 84 are provided on the ejection port surface 8*a*. The ejection unit 81 is placed on the sealing portion 83 and the wiring connected to the ejection unit 81 is sealed with the wiring sealing unit 84. The sealing portion 83 has a concave shape with respect to the ejection unit 81 and the frame portion 82. The wiring sealing unit 84 has a convex shape with respect to the ejection unit 81 and the frame portion 82. Each ejection unit 81 is tilted with respect to the moving direction (the y direction) of the vacuum wiper 172*c*.

The vacuum wiper 172*c* is pressed to the ejection port surface 8*a* by the biasing member 30. Accordingly, the vacuum wiper 172*c* is adaptable to the irregularities on the ejection port surface 8*a* described above to some extent. However, since the multiple ejection units 81 are placed in the moving direction, a portion that is not adaptable to the irregularities on the ejection port surface 8*a* occurs depending on the moving speed or the like and the outside air flows into the apparatus from the opening 26*a* of the vacuum wiper 172*c*.

In contrast, in the present embodiment, the pressure in the buffer tank 44 and the pressure in the vacuum wiper 172*c* are set so as to be reduced to the setting value (the first negative pressure value or the second negative pressure value). Accordingly, even if the outside air flows into the apparatus from the opening 26*a*, a drastic drop of the negative pressure applied to the ejection ports and so on in the opening 26*a* is suppressed. However, the negative pressure values in the vacuum wiper 172*c* and the buffer tank 44 are gradually decreased in conjunction with the movement of the vacuum wiper 172*c*.

In order to resolve this, in the present embodiment, the print controller 202 determines whether the pressure in the buffer tank 44 reaches the predetermined negative pressure value (the third negative pressure value or a fourth negative pressure value) while the vacuum wiper 172*c* is moving in the forward direction. If the vacuum wiper 172*c* is positioned in the preparation area or the ejection failure nozzle area (NO in Step S1624), in Step S1626, the print controller 202 determines whether the pressure in the buffer tank 44 reaches the fourth negative pressure value. If the vacuum wiper 172*c* is positioned in an area other than the preparation area and the ejection failure nozzle area (NO in Step S1616), in Step S1634, the print controller 202 determines whether the pressure in the buffer tank 44 reaches the third negative pressure value. The fourth negative pressure value is lower than the second negative pressure value and the third negative pressure value is lower than the first negative pressure value.

If the print controller 202 determines that the pressure in the buffer tank 44, measured by the pressure sensor 50, reaches the fourth negative pressure value (YES in Step S1626), in Step S1628, the suction motor 42 is driven to restart the suction by the suction pump 24. The vacuum wiper 172*c* is moving in the forward direction also during the processing in Step S1628. In Step S1630, the print controller 202 determines whether the pressure in the buffer tank 44 reaches the second negative pressure value. If the print controller 202 determines that the pressure in the buffer tank 44 reaches the second negative pressure value (YES in Step S1630), in Step S1632, the suction pump 24 is stopped. Then, the process goes to Step S1624.

Similarly, if the print controller 202 determines that the pressure in the buffer tank 44, measured by the pressure sensor 50, reaches the third negative pressure value (YES in Step S1634), in Step S1636, the suction motor 42 is driven to restart the suction by the suction pump 24. The vacuum wiper 172*c* is moving in the forward direction also during the processing in Step S1636. In Step S1638, the print controller 202 determines whether the pressure in the buffer tank 44 reaches the first negative pressure value. If the print controller 202 determines that the pressure in the buffer tank 44 reaches the first negative pressure value (YES in Step S1638), in Step S1640, the suction pump 24 is stopped.

As described above, in the present embodiment, the driving and the stopping of the suction pump 24 are controlled to control the pressure in the buffer tank 44 so as to be kept within a predetermined range (between the third negative pressure value and the first negative pressure value or between the fourth negative pressure value and the second negative pressure value) (refer to FIG. 11).

If the print controller 202 determines that the vacuum wiper 172*c* is in the preparation area (YES in Step S1616), in Step S1624, the print controller 202 determines whether the vacuum wiper 172*c* is moved out of the ejection failure nozzle area. Then, in Step S1642, the print controller 202 determines whether the vacuum wiper 172*c* is moved to a predetermined vacuum wiping termination position.

Also if the print controller 202 determines that the vacuum wiper 172*c* is not in the preparation area (NO in Step S1616), in Step S1642, the print controller 202 determines whether the vacuum wiper 172*c* is moved to the predetermined vacuum wiping termination position.

In Steps S1616, S1624, and S1642, the print controller 202 determines the position of the carriage 172*b* and the position of the vacuum wiper 172*c* based on the result of detection by the rotary encoder 33.

If the print controller 202 determines that the vacuum wiper 172*c* is not moved to the predetermined vacuum wiping termination position (NO in Step S1642), the process goes back to Step S1616. If the print controller 202 determines that the vacuum wiper 172*c* is moved to the predetermined vacuum wiping termination position (YES in Step S1642), the vacuum wiping process A is terminated.

After the vacuum wiping process A is terminated, the printing head 8 is moved upward by the print controller 202. After the vacuum wiper 172*c* is apart from the ejection port surface 8*a*, the print controller 202 moves the carriage 172*b* in the backward direction to position the carriage 172*b* at one end portion of the opening 172*aa*.

As described above, performing the vacuum wiping process A makes the negative pressure in the suction from the ejection-failed ejection ports higher than the negative pressure in the suction from the ejection ports in a good ejection state. Accordingly, compared with a case in which the suction at constant negative pressure is performed for all the ejection ports, it is possible to perform stronger recovery to the ejection-failed ejection port to realize a configuration in which the ink is not excessively sucked from the ejection ports in the good ejection state other than the ejection-failed ejection ports.

The driving of the suction pump 24 is restarted in the preparation areas upstream of the ejection failure nozzle areas in the moving direction of the vacuum wiper 172*c* so that the suction at higher negative pressure is performed for the ejection-failed ejection ports. This enables appropriate recovery to be performed for the ejection-failed ejection ports without stopping the movement of the vacuum wiper 172*c* and the suction operation. Accordingly, compared with a case in which the vacuum wiper 172*c* is stopped at positions opposed to the ejection-failed ejection ports, it possible to reduce the time required for the vacuum wiping process to improve the throughput of the recovery operation.

Vacuum Wiping Process B (Control of Moving Speed)

Figure 12:
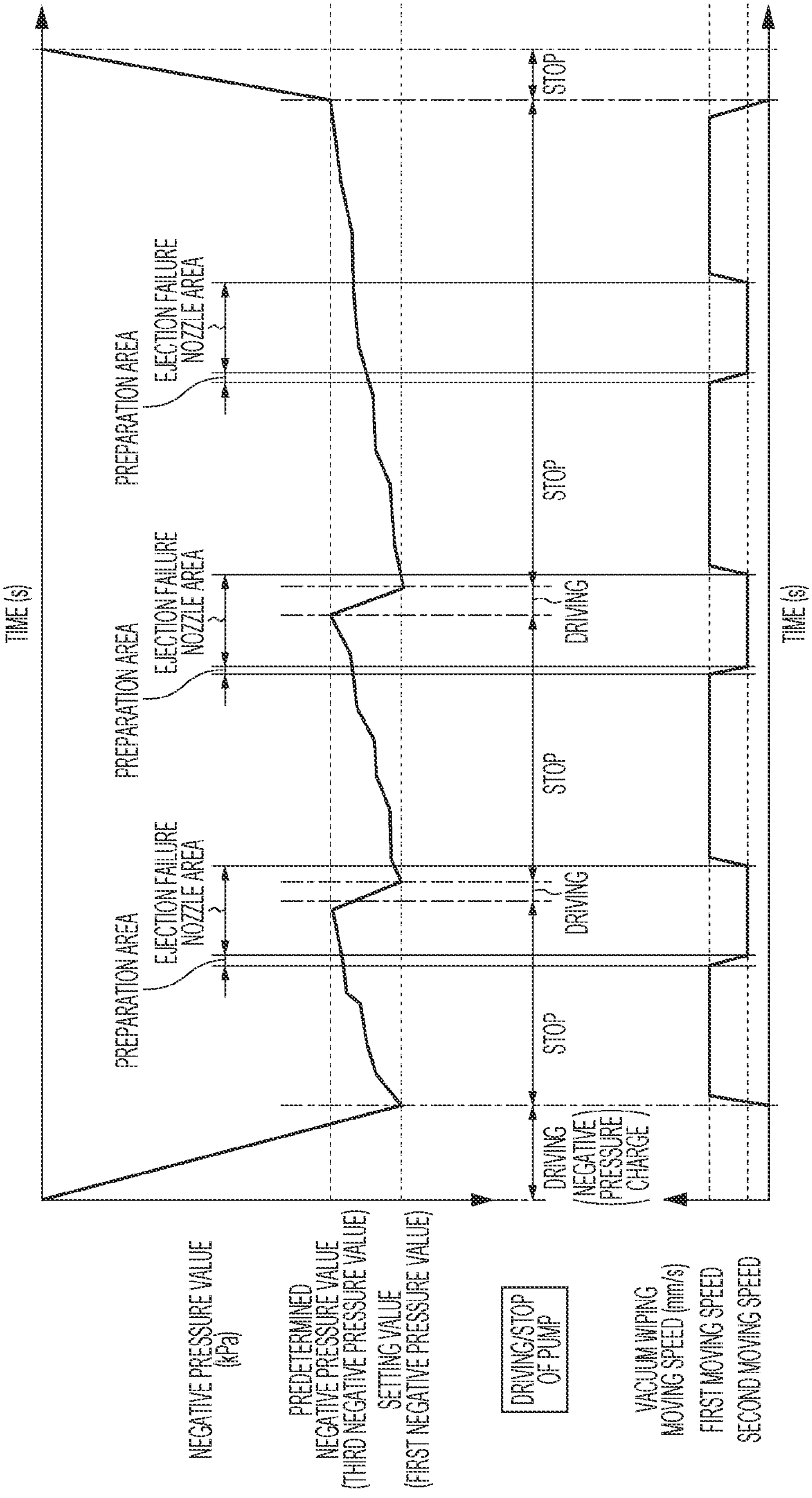
FIG. 12 is a graph illustrating variation in pressure in a vacuum wiping process B and a moving speed of the vacuum wiper.
Figure 14:
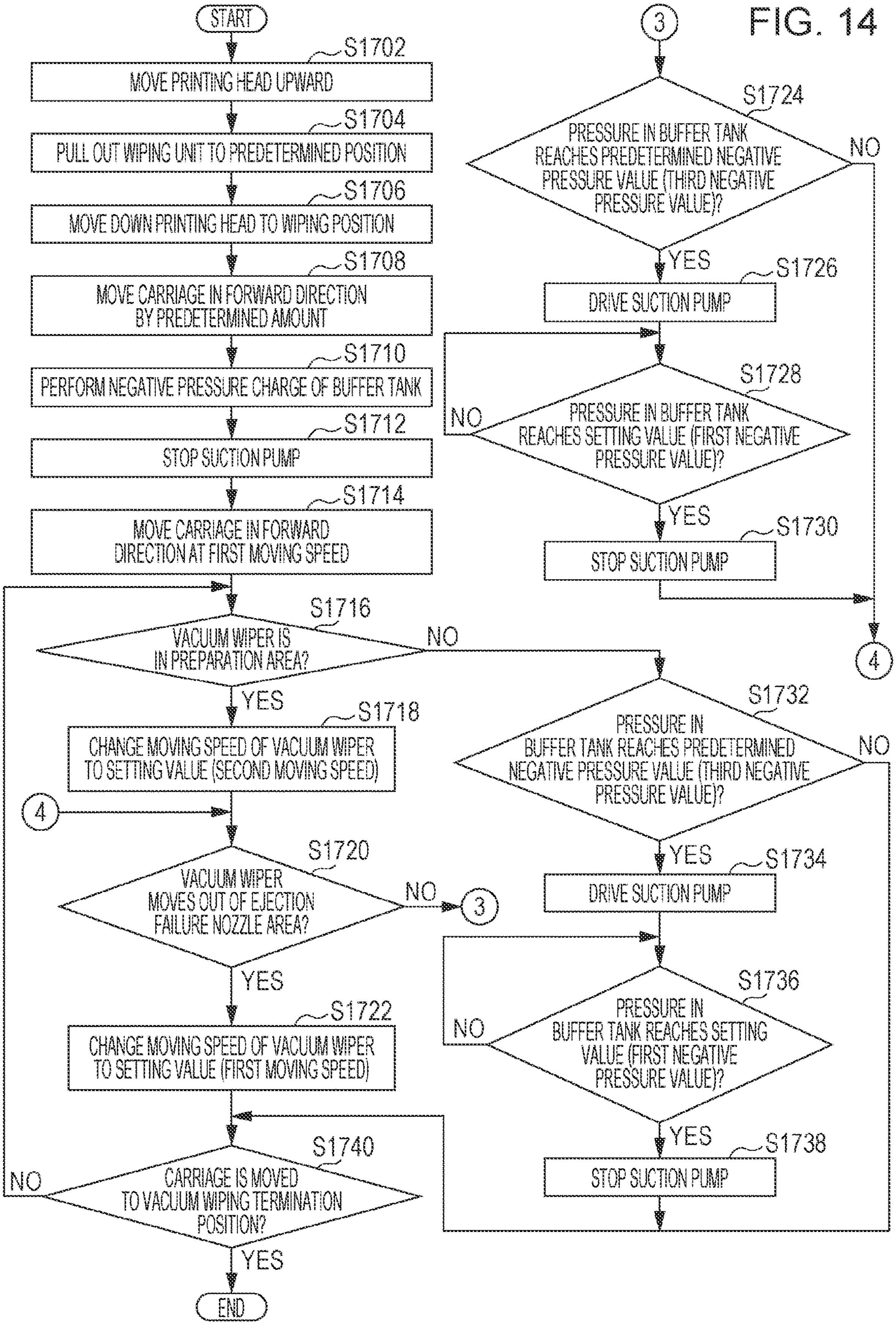
FIG. 14 is a flowchart illustrating the vacuum wiping process B in detail.

FIG. 12 is a graph illustrating how the pressure value in the buffer tank 44 is varied and how the moving speed of the vacuum wiper 172*c* is varied when the vacuum wiping process B is performed. FIG. 14 is a flowchart illustrating the vacuum wiping process B.

Steps S1702 to S1712 are the same as Steps S1602 to S1612 in FIG. 13. Then, in Step S1714, the carriage 172*b* is moved in the forward direction by the print controller 202 in the state in which the vacuum wiper 172*c* abuts against the ejection port surface 8*a* to perform the vacuum wiping from the respective ejection ports of the ejection unit 81 arranged on the ejection port surface 8*a*. The vacuum wiper 172*c* is moved at a first moving speed in Step S1714.

While the vacuum wiper 172*c* is moving in the forward direction, in Step S1716, the print controller 202 determines whether the vacuum wiper 172*c* is moved to the preparation area. If the print controller 202 determines that the vacuum wiper 172*c* is in the preparation area (YES in Step S1716), in Step S1718, the moving speed of the vacuum wiper 172*c* is changed to a second moving speed. The second moving speed is lower than the first moving speed. Also during the processing in Step S1718, the vacuum wiper 172*c* continues the movement in the forward direction to pass through the ejection failure nozzle area after the preparation area. In Step S1720, the print controller 202 determines whether the vacuum wiper 172*c* is moved out of the ejection failure nozzle area.

If the print controller 202 determines whether the vacuum wiper 172*c* is not moved out of the ejection failure nozzle area (NO in Step S1720), in Step S1724, the print controller 202 determines whether the pressure in the buffer tank 44 reaches the third negative pressure value during the movement of the vacuum wiper 172*c* in the forward direction, as in Step S1626 in the vacuum wiping process A. If the vacuum wiper 172*c* is positioned in an area other than the preparation area and the ejection failure nozzle area (NO in Step S1716), in Step S1732, the print controller 202 determines whether the pressure in the buffer tank 44 reaches the third negative pressure value. The third negative pressure value is lower than the first negative pressure value in the negative pressure charge in Step S1710.

If the print controller 202 determines that the pressure in the buffer tank 44, measured by the pressure sensor 50, reaches the third negative pressure value (YES in Step S1724), in Step S1726, the suction motor 42 is driven to restart the suction by the suction pump 24. The vacuum wiper 172*c* is moving in the forward direction also during the processing in Step S1726. In Step S1728, the print controller 202 determines whether the pressure in the buffer tank 44 reaches the first negative pressure value. If the print controller 202 determines that the pressure in the buffer tank 44 reaches the first negative pressure value (YES in Step S1728), in Step S1730, the suction pump 24 is stopped. Then, the process goes to Step S1720.

Similarly, if the print controller 202 determines that the pressure in the buffer tank 44, measured by the pressure sensor 50, reaches the third negative pressure value (YES in Step S1732), in Step S1734, the suction motor 42 is driven to restart the suction by the suction pump 24. The vacuum wiper 172*c* is moving in the forward direction also during the processing in Step S1734. In Step S1736, the print controller 202 determines whether the pressure in the buffer tank 44 reaches the first negative pressure value. If the print controller 202 determines that the pressure in the buffer tank 44 reaches the first negative pressure value (YES in Step S1736), in Step S1738, the suction pump 24 is stopped.

As described above, also in the vacuum wiping process B, the driving and the stopping of the suction pump 24 are controlled to control the pressure in the buffer tank 44 so as to be kept within the predetermined range (between the third negative pressure value and the first negative pressure value) (refer to FIG. 12).

If the print controller 202 determines that the vacuum wiper 172*c* is in the preparation area (YES in Step S1716) and the print controller 202 determines that the vacuum wiper 172*c* is moved out of the ejection failure nozzle area (YES in Step S1720), in Step S1722, the moving speed of the vacuum wiper 172*c* is changed to the first moving speed. Then, in Step S1740, the print controller 202 determines whether the vacuum wiper 172*c* is moved to a predetermined vacuum wiping termination position.

Also if the print controller 202 determines that the vacuum wiper 172*c* is not in the preparation area (NO in Step S1716), in Step S1740, the print controller 202 determines whether the vacuum wiper 172*c* is moved to the predetermined vacuum wiping termination position.

In Steps S1716 and S1740, the print controller 202 determines the position of the carriage 172*b* and the position of the vacuum wiper 172*c* based on the result of detection by the rotary encoder 33.

If the print controller 202 determines that the vacuum wiper 172*c* is not moved to the predetermined vacuum wiping termination position (NO in Step S1740), the process goes back to Step S1716. If the print controller 202 determines that the vacuum wiper 172*c* is moved to the predetermined vacuum wiping termination position (YES in Step S1740), the vacuum wiping process B is terminated.

After the vacuum wiping process B is terminated, the printing head 8 is moved upward by the print controller 202. After the vacuum wiper 172*c* is apart from the ejection port surface 8*a*, the print controller 202 moves the carriage 172*b* in the backward direction to position the carriage 172*b* at one end portion of the opening 172*aa*.

As described above, performing the vacuum wiping process B makes the suction time for the ejection-failed ejection ports longer than the suction time for the ejection ports in the good ejection state. Accordingly, compared with a case in which the suction is performed for all the ejection ports for the same suction time, it is possible to perform stronger recovery to the ejection-failed ejection port to realize a configuration in which the ink is not excessively sucked from the ejection ports in the good ejection state.

The moving speed of the vacuum wiper 172*c* is decreased in the preparation areas upstream of the ejection failure nozzle areas in the moving direction of the vacuum wiper 172*c* so that the suction is performed for the ejection-failed ejection ports for the longer suction time. This enables appropriate recovery to be performed for the ejection-failed ejection ports without stopping the movement of the vacuum wiper 172*c* and the suction operation. Accordingly, compared with a case in which the moving speed is changed after the vacuum wiper 172*c* is stopped at positions opposed to the ejection-failed ejection ports, it possible to reduce the time required for the vacuum wiping process to improve the throughput of the recovery operation.

The configuration is described in the present embodiment in which either of the vacuum wiping process A and the vacuum wiping process B is selected and performed in the printing apparatus capable of performing both the vacuum wiping process A and the vacuum wiping process B. Since the moving speed of the vacuum wiper 172*c* is not changed in the vacuum wiping process A, the recovery time in the vacuum wiping process A is shorter than that in the vacuum wiping process B. Accordingly, for example, when priority is given to the throughput of the recovery operation, it is more effective to select the vacuum wiping process A.

In contrast, since the negative pressure value caused by the suction pump 24 is not varied in the vacuum wiping process B, the driving noise in the driving of the suction pump 24 may be suppressed, compared with that in the vacuum wiping process A. Accordingly, when the driving noise of the suction pump 24 is desirably suppressed, it is more effective to select the vacuum wiping process B.

The present disclosure is applicable to a printing apparatus capable of performing only one of the vacuum wiping process A and the vacuum wiping process B. It is sufficient to realize appropriate recovery by differentiating the suction conditions for the ejection-failed ejection ports from the suction conditions for the ejection ports other than the ejection-failed ejection port.

In the above embodiments, the “ink” should be widely interpreted. Accordingly, the concept of the “ink” may include incidental liquid that can be supplied for processing of the recording medium, processing of the ink (for example, solidification or insolubilization of color materials in the ink added on the recording medium), and so on, in addition to the liquid that is added on the recording medium to form an image, a mark, a pattern, and so on.

According to the above embodiments, it is possible to provide a printing apparatus capable of appropriately recovering the ejection-failed ejection ports.

Other Embodiments

Embodiment(s) of the present disclosure can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-054575 filed Mar. 29, 2021, which is hereby incorporated by reference herein in its entirety.

What is claimed is:

1. A printing apparatus comprising:

a printing unit including an ejection port surface provided with a plurality of ejection ports through which liquid is to be ejected;

a wiping unit having an opening and configured to wipe the ejection port surface by moving in a predetermined direction while the opening of the wiping unit abuts against the ejection port surface;

a depressurizing unit configured to apply negative pressure through the opening to the ejection port surface; and a control unit configured to perform a suction operation to suck liquid from ejection ports while moving the wiping unit after driving the depressurizing unit in a state in which the opening abuts against the ejection port surface, wherein, in performing the suction operation, the control unit determines while the depressurizing unit is stopped whether the wiping unit is in a preparation area upstream of a position of a first ejection port detected as an ejection-failed ejection port of the plurality of ejection ports, wherein, in a case where the control unit determines that the wiping unit is in the preparation area, the control unit drives the depressurizing unit to increase the negative pressure to a second negative pressure value that is higher than a first negative pressure value and moves the wiping unit to suction wipe the ejection-failed ejection port, and wherein, in a case where the control unit determines that the wiping unit is not in the preparation area, the control unit drives the depressurizing unit to increase the negative pressure towards the first negative pressure value from a third negative pressure value that is lower than the first negative pressure value and moves the wiping unit to suction wipe an ejection port of the plurality of ejection ports that is not an ejection-failed ejection port.

2. The printing apparatus according to claim 1, further comprising:

a flow channel configured to connect the wiping unit to the depressurizing unit; and a pressure detection unit configured to detect a value of pressure in the flow channel, wherein, in performing the suction operation, the control unit performs the suction operation from the first ejection port at a negative pressure value higher than a negative pressure value exerted on the ejection ports of the plurality of ejection ports other than the first ejection port.

3. The printing apparatus according to claim 2, wherein the control unit controls driving and stopping of the depressurizing unit so that the negative pressure value exerted in the suction operation is within a predetermined range, and wherein the depressurizing unit is driven in a state in which the wiping unit is positioned in the preparation area upstream of the first ejection port in the predetermined direction and the depressurizing unit is stopped if the negative pressure value detected by the pressure detection unit reaches a predetermined setting value.

4. The printing apparatus according to claim 2, further comprising a buffer tank configured to be provided on the flow channel and to have a predetermined capacity, wherein the pressure detection unit is configured to detect a value of pressure in the buffer tank.

5. The printing apparatus according to claim 1, wherein, in performing the suction operation, the control unit performs the suction operation from the first ejection port at a moving speed lower than a moving speed of the wiping unit in the suction operation from the ejection ports of the plurality of ejection ports other than the first ejection port.

6. The printing apparatus according to claim 5, wherein the control unit varies the moving speed of the suction operation in a state in which the wiping unit is positioned in the preparation area upstream of the first ejection port in the predetermined direction.

7. The printing apparatus according to claim 5, wherein the control unit is configured to control driving and stopping of the depressurizing unit so that a negative pressure value exerted in the suction operation is within a predetermined range.

8. The printing apparatus according to claim 1, wherein the control unit is configured not to stop the movement of the wiping unit in the predetermined direction during the suction operation.

9. The printing apparatus according to claim 1, wherein the wiping unit includes a blade wiper unit and a vacuum wiper unit configured to perform a vacuum wiping operation after the blade wiper unit performs a blade wiping operation.

10. The printing apparatus according to claim 1, wherein, to inhibit outside air from flowing into the printing apparatus between a vacuum wiper of a vacuum wiper unit of the wiping unit and a suction preparation surface of the ejection port surface in a negative pressure charge of a buffer tank of a suction mechanism that includes the depressurizing unit, a carriage of the wiping unit is moved in a forward direction by a predetermined amount in a state in which the vacuum wiper abuts against the suction preparation surface to cause a leading end surface of an elastic member that includes the opening to abut against the suction preparation surface with an edge of the leading end surface.

11. The printing apparatus according to claim 1, further comprising a buffer tank configured to have a pressure, wherein, in the case where the control unit determines that the wiping unit is not in the preparation area and the control unit determines that the pressure in the buffer tank reaches the third negative pressure value, the control unit drives the depressurizing unit, wherein, in a case where the control unit determines that the wiping unit is in the preparation area and the control unit determines that the pressure in the buffer tank reaches a fourth negative pressure value, the control unit drives the depressurizing unit, and wherein the first and third negative pressure values are lower than the fourth negative pressure value and the fourth negative pressure value is lower than the second negative pressure value.

12. A method for a printing apparatus having a printing unit including an ejection port surface provided with a plurality of ejection ports through which liquid is to be ejected, a wiping unit having an opening, and a depressurizing unit, the method comparisons:

wiping the ejection port surface by moving the wiping unit in a predetermined direction while the opening of the wiping unit abuts against the ejection port surface;

applying, depressurizing unit, negative pressure through the opening to the ejection port surface; and performing a suction operation to suck liquid from ejection ports while moving the wiping unit after driving the depressurizing unit in a state in which the opening abuts against the ejection port surface, wherein performing the suction operation includes determining while the depressurizing unit is stopped whether the wiping unit is in a preparation area upstream of a position of a first ejection port detected an ejection-failed ejection port of the plurality of ejection ports, wherein, in a case where it is determined that the wiping unit is in the preparation area, performing the suction operation includes driving the depressurizing unit to increase the negative pressure to a second negative pressure value that is higher than a first negative pressure value and moving the wiping unit to suction wipe the ejection-failed ejection port, and wherein, in a case where it is determined that the wiping unit is not in the preparation area, performing the suction operation includes driving the depressurizing unit to increase the negative pressure towards the first negative pressure value from a third negative pressure value that is lower than the first negative pressure value and moving the wiping unit to suction wipe an ejection port of the plurality of ejection ports that is not an ejection-failed ejection port.

13. The method according to claim 12, wherein the printing apparatus further includes a pressure detection unit and a flow channel configured to connect the wiping unit to the depressurizing unit, the method further comprising:

detecting, via a pressure detection unit, a value of pressure in the flow channel, wherein performing the suction operation includes performing the suction operation from the first ejection port at a negative pressure value higher than a negative pressure value exerted on the ejection ports of the plurality of ejection ports other than the first ejection port.

14. The method according to claim 12, wherein performing the suction operation includes performing the suction operation from the first ejection port at a moving speed lower than a moving speed of the wiping unit in the suction operation from the ejection ports of the plurality of ejection ports other than the first ejection port.

* * * * *